(12) United States Patent
Fujinawa et al.

(10) Patent No.: US 11,262,838 B2
(45) Date of Patent: Mar. 1, 2022

(54) INFORMATION PROCESSING DEVICE AND INFORMATION PROCESSING METHOD

(71) Applicant: SONY CORPORATION, Tokyo (JP)

(72) Inventors: Eisuke Fujinawa, Tokyo (JP); Tetsuo Ikeda, Tokyo (JP); Kensuke Kitamura, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/962,384

(22) PCT Filed: Dec. 13, 2018

(86) PCT No.: PCT/JP2018/045939
§ 371 (c)(1),
(2) Date: Jul. 15, 2020

(87) PCT Pub. No.: WO2019/150781
PCT Pub. Date: Aug. 8, 2019

(65) Prior Publication Data
US 2021/0064122 A1 Mar. 4, 2021

(30) Foreign Application Priority Data
Jan. 30, 2018 (JP) ............................. JP2018-013356

(51) Int. Cl.
*G06F 3/01* (2006.01)
*G06T 7/70* (2017.01)
*G06T 19/00* (2011.01)

(52) U.S. Cl.
CPC ................ *G06F 3/011* (2013.01); *G06T 7/70* (2017.01); *G06T 19/006* (2013.01)

(58) Field of Classification Search
CPC .......... G06F 3/011; G06T 7/70; G06T 19/006
See application file for complete search history.

(56) References Cited

U.S. PATENT DOCUMENTS

| | | | |
|---|---|---|---|
| 2002/0084974 A1 | 7/2002 | Ohshima et al. | |
| 2003/0032484 A1 | 2/2003 | Ohshima et al. | |
| 2006/0244820 A1* | 11/2006 | Morita | G06T 19/006 348/14.13 |
| 2008/0094417 A1* | 4/2008 | Cohen | A63F 13/52 345/632 |
| 2013/0286004 A1 | 10/2013 | McCulloch et al. | |

(Continued)

FOREIGN PATENT DOCUMENTS

| | | |
|---|---|---|
| EP | 0899690 A2 | 3/1999 |
| EP | 2680230 A2 | 1/2014 |

(Continued)

OTHER PUBLICATIONS

International Search Report and Written Opinion of PCT Application No. PCT/JP2018/045939, dated Feb. 26, 2019, 09 pages of ISRWO.

*Primary Examiner* — Yu Chen
(74) *Attorney, Agent, or Firm* — Chip Law Group

(57) ABSTRACT

Provided is an information processing device that provides feedback to a user. The information processing device includes: a recognition unit that recognizes a physical relation between a real object and a first virtual object positioned on an identical surface and a control unit that controls the behavior of the real object based on the physical relation.

15 Claims, 31 Drawing Sheets

(56) References Cited

U.S. PATENT DOCUMENTS

| | | | | |
|---|---|---|---|---|
| 2014/0002493 A1* | 1/2014 | Mitchell | ................ | A63F 13/25 345/633 |
| 2015/0015607 A1* | 1/2015 | Sodhi | .................... | G06F 3/0425 345/633 |
| 2015/0185826 A1 | 7/2015 | Mullins | | |
| 2015/0254870 A1* | 9/2015 | Knibbe | ................... | G01S 11/12 345/633 |
| 2016/0054837 A1* | 2/2016 | Stafford | ............... | G02B 27/017 463/33 |
| 2016/0093107 A1* | 3/2016 | Yamamoto | ............ | A63F 13/212 345/633 |
| 2016/0349835 A1* | 12/2016 | Shapira | .................. | G06F 3/016 |
| 2018/0240220 A1* | 8/2018 | Katori | ..................... | G06T 5/003 |

FOREIGN PATENT DOCUMENTS

| | | |
|---|---|---|
| EP | 2988275 A1 | 2/2016 |
| JP | 11-088913 A | 3/1999 |
| JP | 2000-350865 A | 12/2000 |
| JP | 2014-010838 A | 1/2014 |
| JP | 2015-090524 A | 5/2015 |
| WO | 2014/171200 A1 | 10/2014 |
| WO | 2015/102903 A1 | 7/2015 |

* cited by examiner

| REAL OBJECT NAME (RECOGNITION) | RECOGNITION INFORMATION | RECOGNITION METHOD | SINGLE/ PLURAL |
|---|---|---|---|
| | | | |

| VIRTUAL OBJECT NAME | UPDATE INFORMATION | UPDATE METHOD | SINGLE/ PLURAL |
|---|---|---|---|
| | | | |

| REAL OBJECT NAME (CONTROL) | CONTROL TARGET | CONTROL INFORMATION | COMMUNI- CATION METHOD | SINGLE/ PLURAL |
|---|---|---|---|---|
| | | | | |

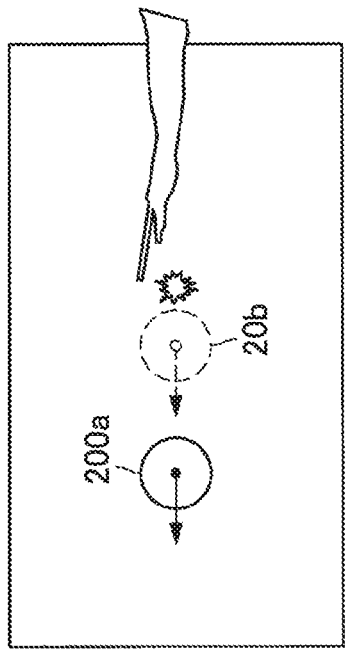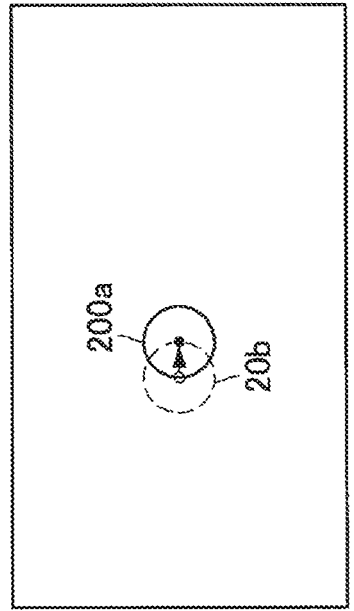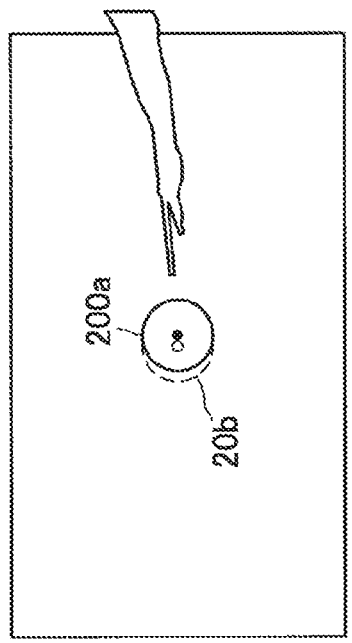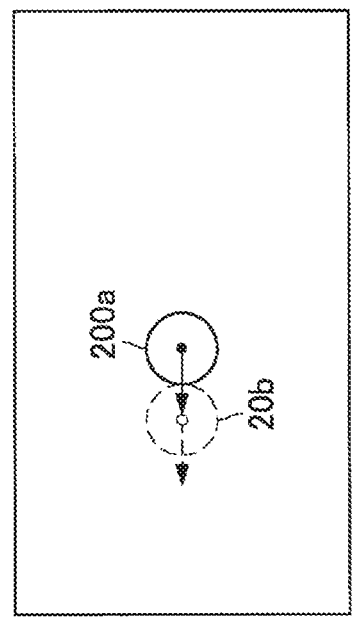

FIG.12

| REAL OBJECT NAME (RECOGNITION) | RECOGNITION INFORMATION | RECOGNITION METHOD | SINGLE/PLURAL |
|---|---|---|---|
| SHOOT BALL ROBOT | POSITION, SPEED | DEPTH IMAGE PROCESSING | SINGLE |

FIG.13

| VIRTUAL OBJECT NAME | UPDATE INFORMATION | UPDATE METHOD | SINGLE/PLURAL |
|---|---|---|---|
| VIRTUAL BALL | POSITION, SPEED | PHYSICAL SIMULATION | PLURAL |
| VIRTUAL SHOOT BALL | POSITION, SPEED | PHYSICAL SIMULATION | SINGLE |

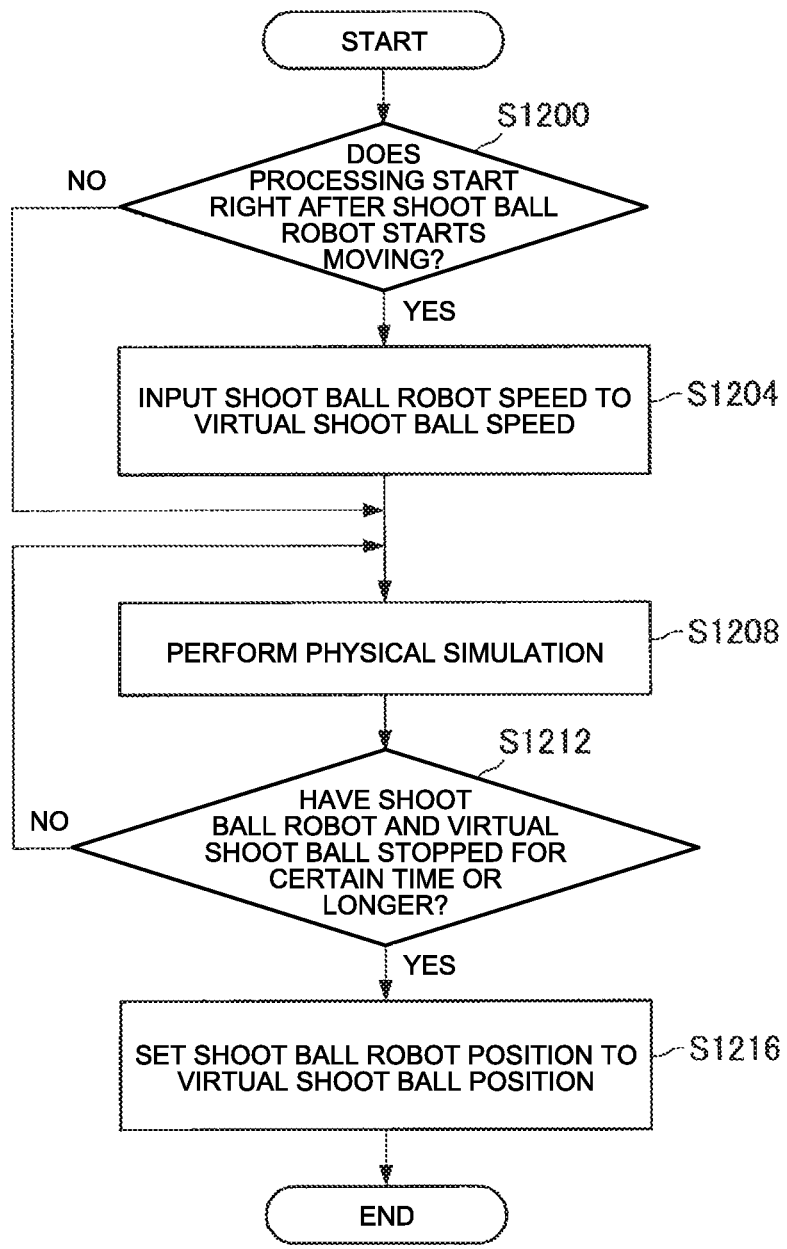

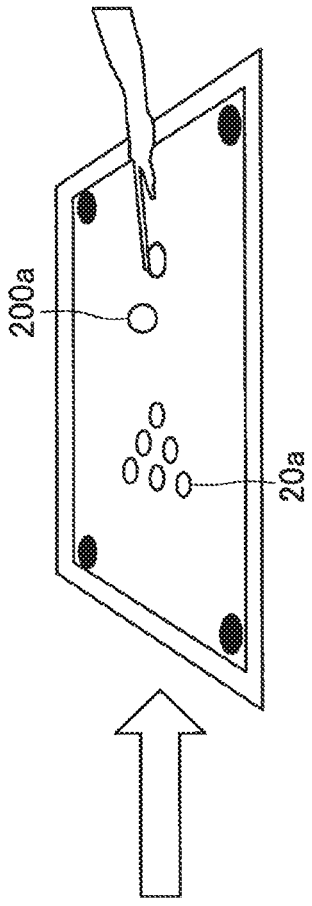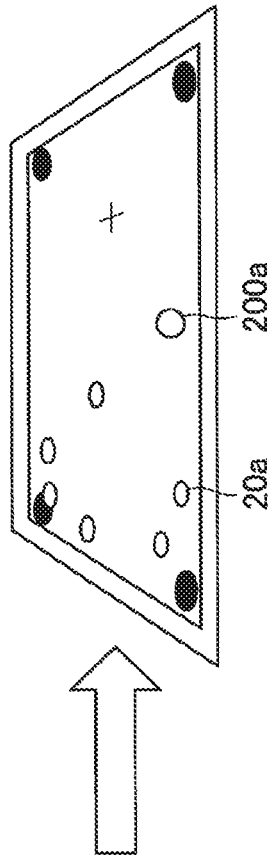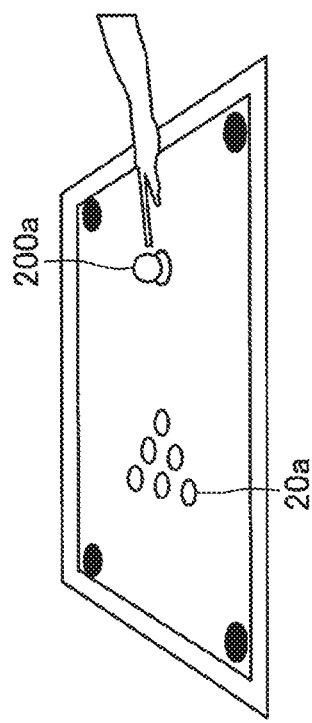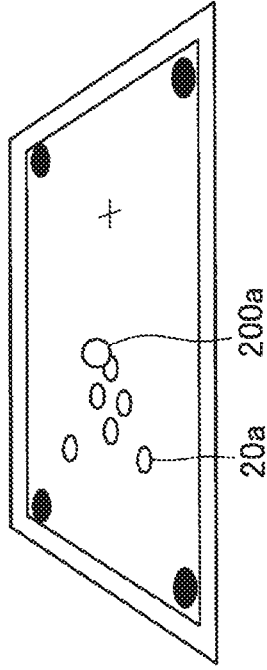

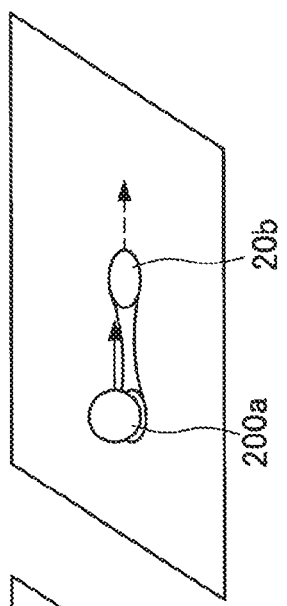
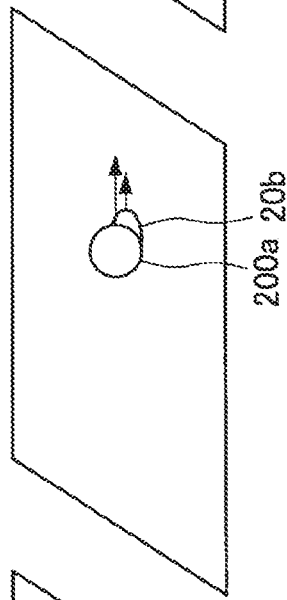
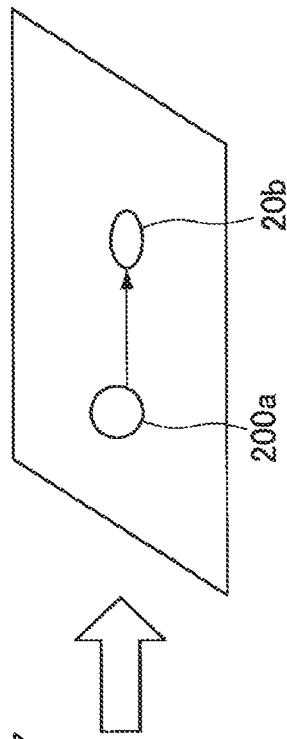
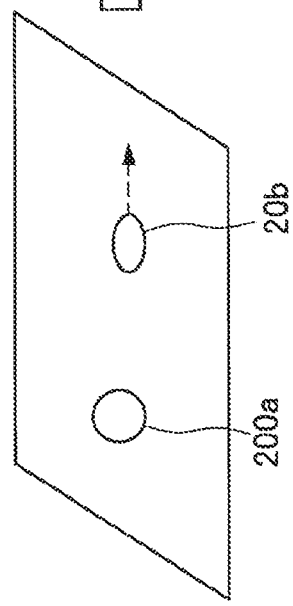

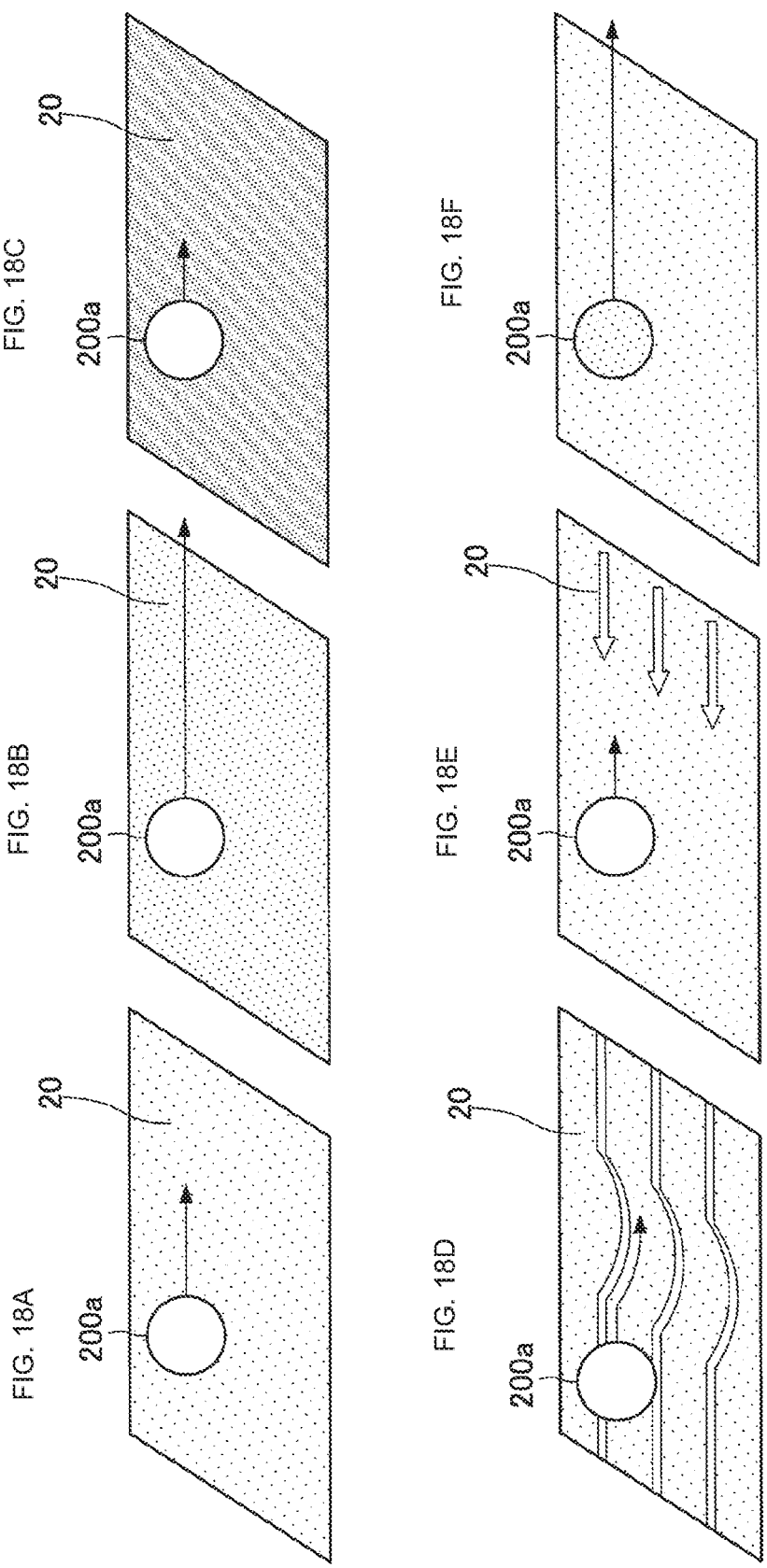

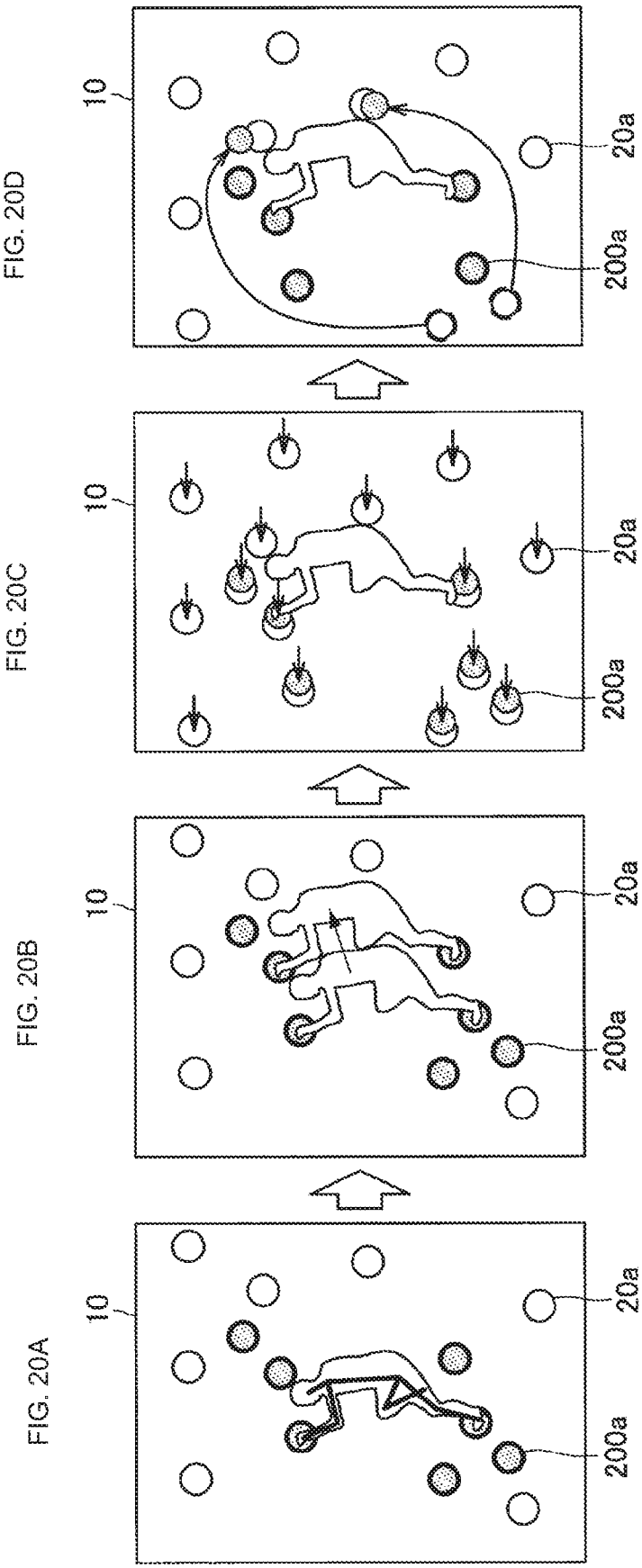

FIG. 21A

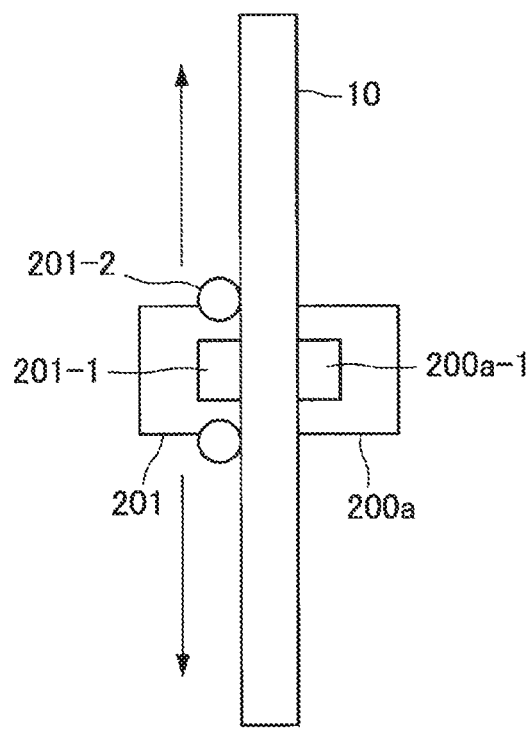

FIG. 21B

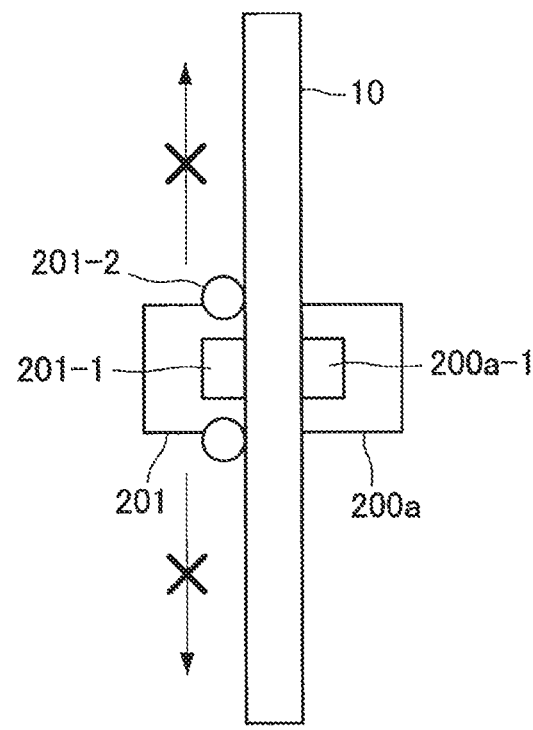

FIG. 22

| REAL OBJECT NAME (RECOGNITION) | RECOGNITION INFORMATION | RECOGNITION METHOD | SINGLE/ PLURAL |
|---|---|---|---|
| ROCK ROBOT | POSITION, POSTURE | MARKER PATTERN | PLURAL |
| USER | BONE INFORMATION, CENTRAL POSITION | IMAGE PROCESSING | SINGLE |

FIG. 23

| VIRTUAL OBJECT NAME | UPDATE INFORMATION | UPDATE METHOD | SINGLE/ PLURAL |
|---|---|---|---|
| VIRTUAL ROCK | POSITION | MOVE IN ACCORDANCE WITH USER CENTER COORDINATES | PLURAL |

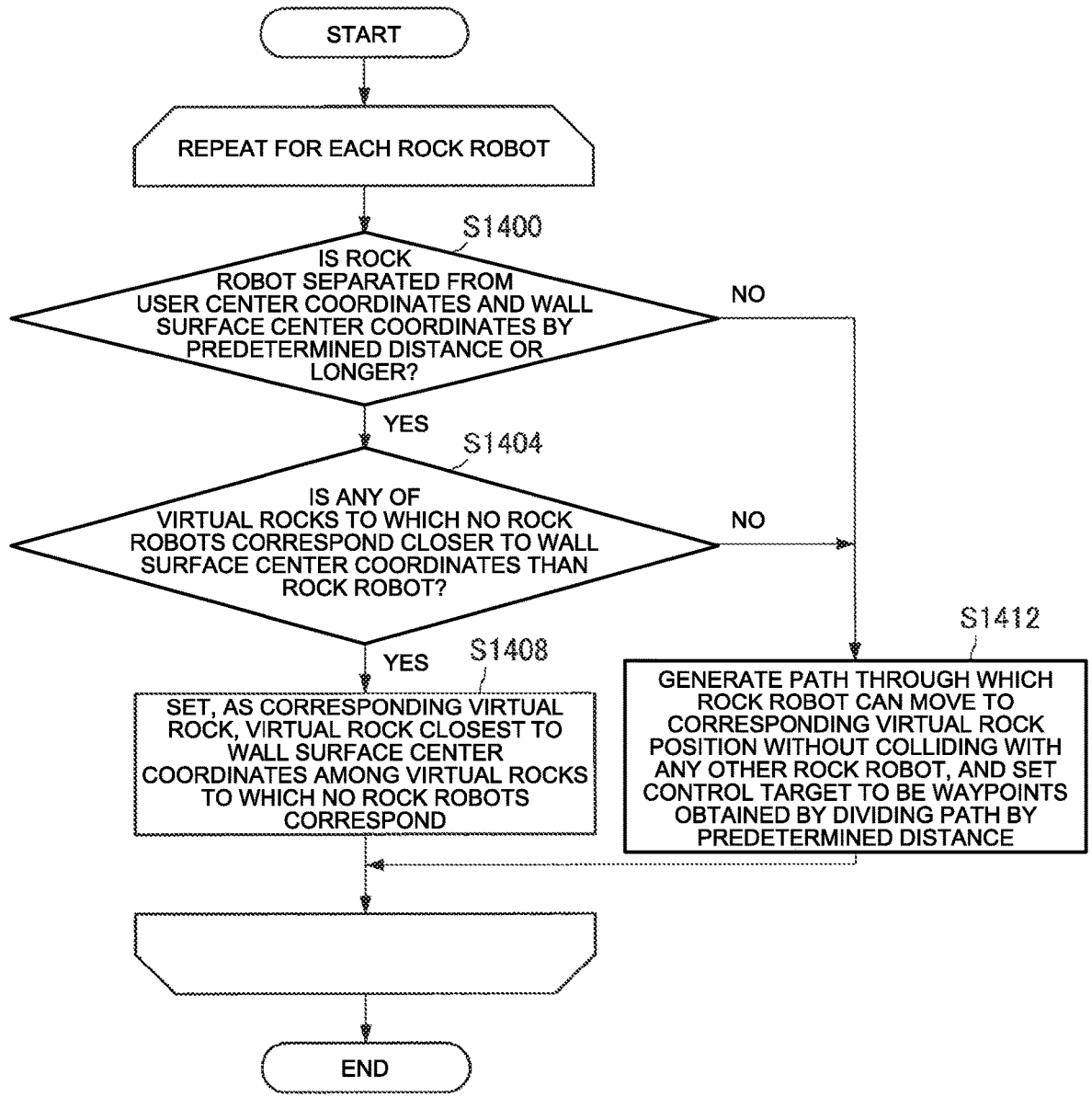

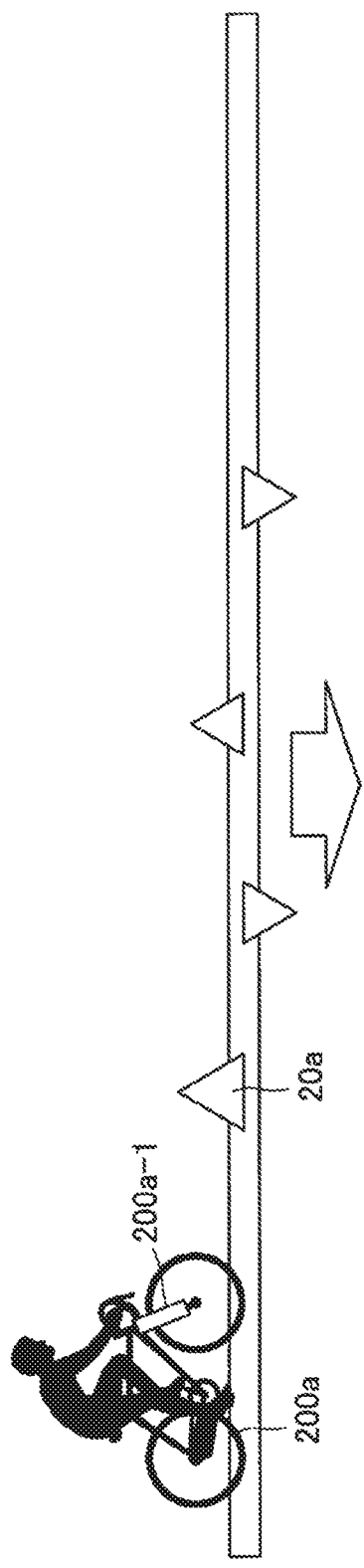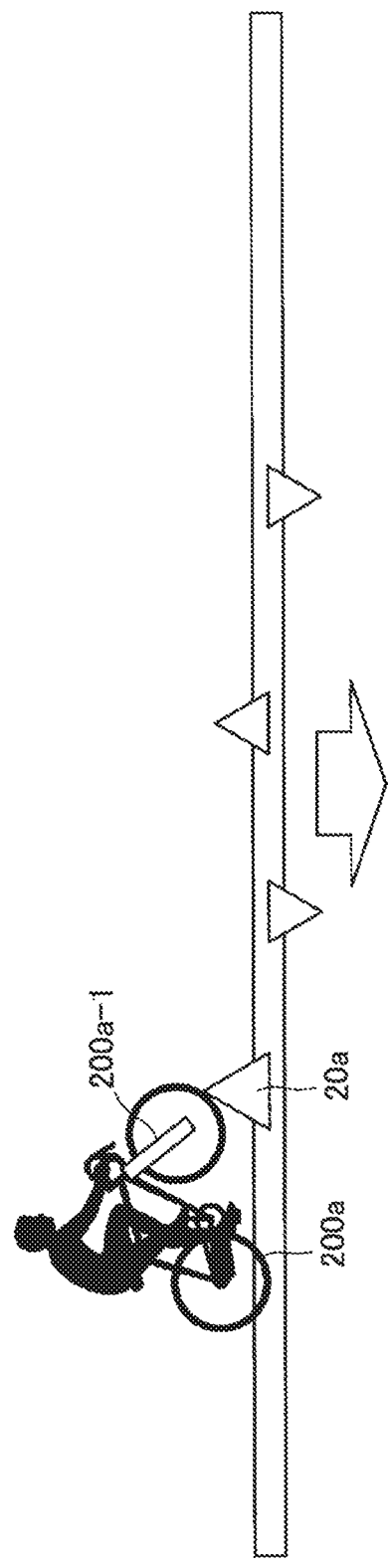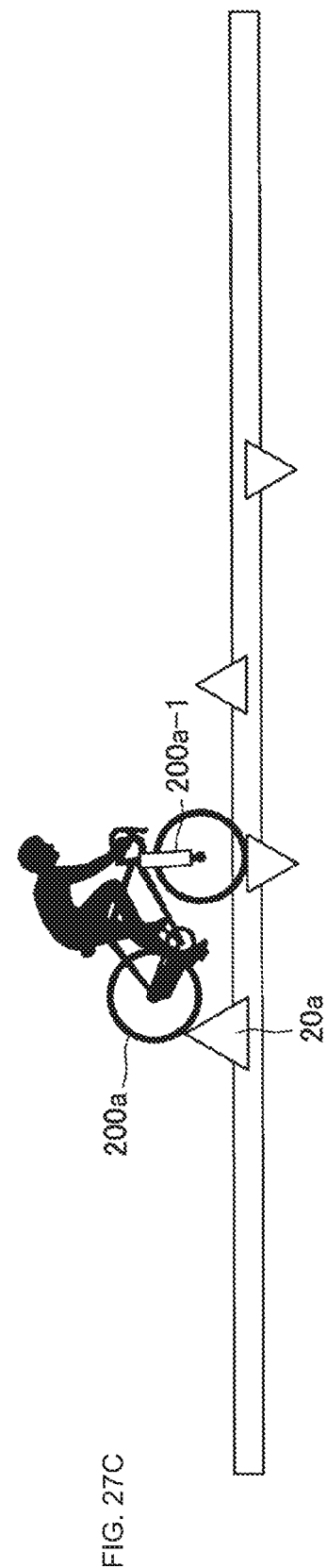

FIG.28

| REAL OBJECT NAME (RECOGNITION) | RECOGNITION INFORMATION | RECOGNITION METHOD | SINGLE/PLURAL |
|---|---|---|---|
| USER HEAD (INFORMATION PROCESSING DEVICE) | POSITION, POSTURE, SPEED | SLAM (DEPTH IMAGE, MOTION SENSOR) | SINGLE |
| BICYCLE ROBOT | POSITION, POSTURE, SPEED, SUSPENSION LENGTH | SLAM (DEPTH IMAGE, MOTION SENSOR) | SINGLE |

FIG.29

| VIRTUAL OBJECT NAME | UPDATE INFORMATION | UPDATE METHOD | SINGLE/PLURAL |
|---|---|---|---|
| VIRTUAL IRREGULARITY | POSITION | USER HEAD POSITION, MOVEMENT IN ACCORDANCE WITH POSTURE | PLURAL |

FIG.30

| REAL OBJECT NAME (CONTROL) | CONTROL TARGET | CONTROL INFORMATION | COMMUNICATION METHOD | SINGLE/PLURAL |
|---|---|---|---|---|
| SUSPENSION | LENGTH | LENGTH | Bluetooth | SINGLE |

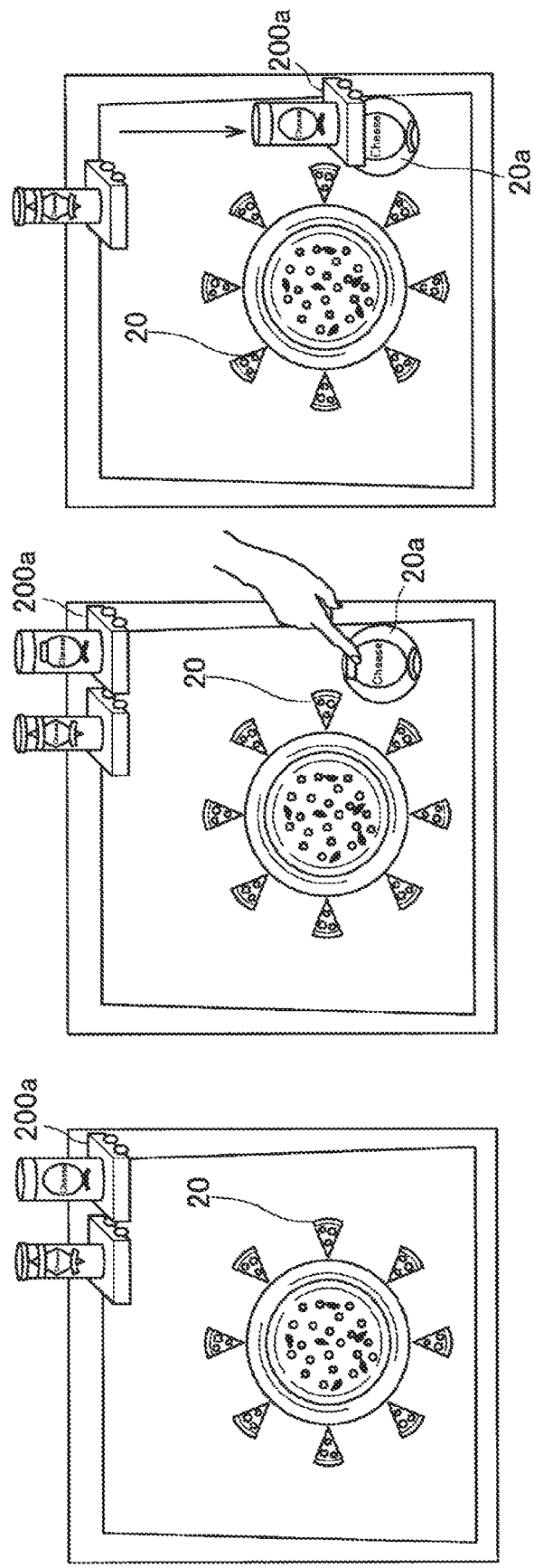

FIG.36

| REAL OBJECT NAME (RECOGNITION) | RECOGNITION INFORMATION | RECOGNITION METHOD | SINGLE/ PLURAL |
|---|---|---|---|
| DISH | DISH KIND, POSITION | IMAGE PROCESSING | SINGLE |
| TRUCK ROBOT | TRUCK ROBOT KIND, POSITION, POSTURE | IMAGE PROCESSING | PLURAL |

FIG.37

| VIRTUAL OBJECT NAME | UPDATE INFORMATION | UPDATE METHOD | SINGLE/ PLURAL |
|---|---|---|---|
| VIRTUAL CONDIMENT | POSITION | USER GESTURE, AND THE LIKE | PLURAL |

| REAL OBJECT NAME (CONTROL) | CONTROL TARGET | CONTROL INFORMATION | COMMUNICATION METHOD | SINGLE/ PLURAL |
|---|---|---|---|---|
| TRUCK ROBOT | POSITION | LIGHT BEAM COLOR, POSITION | VISIBLE LIGHT COMMUNICATION | PLURAL |

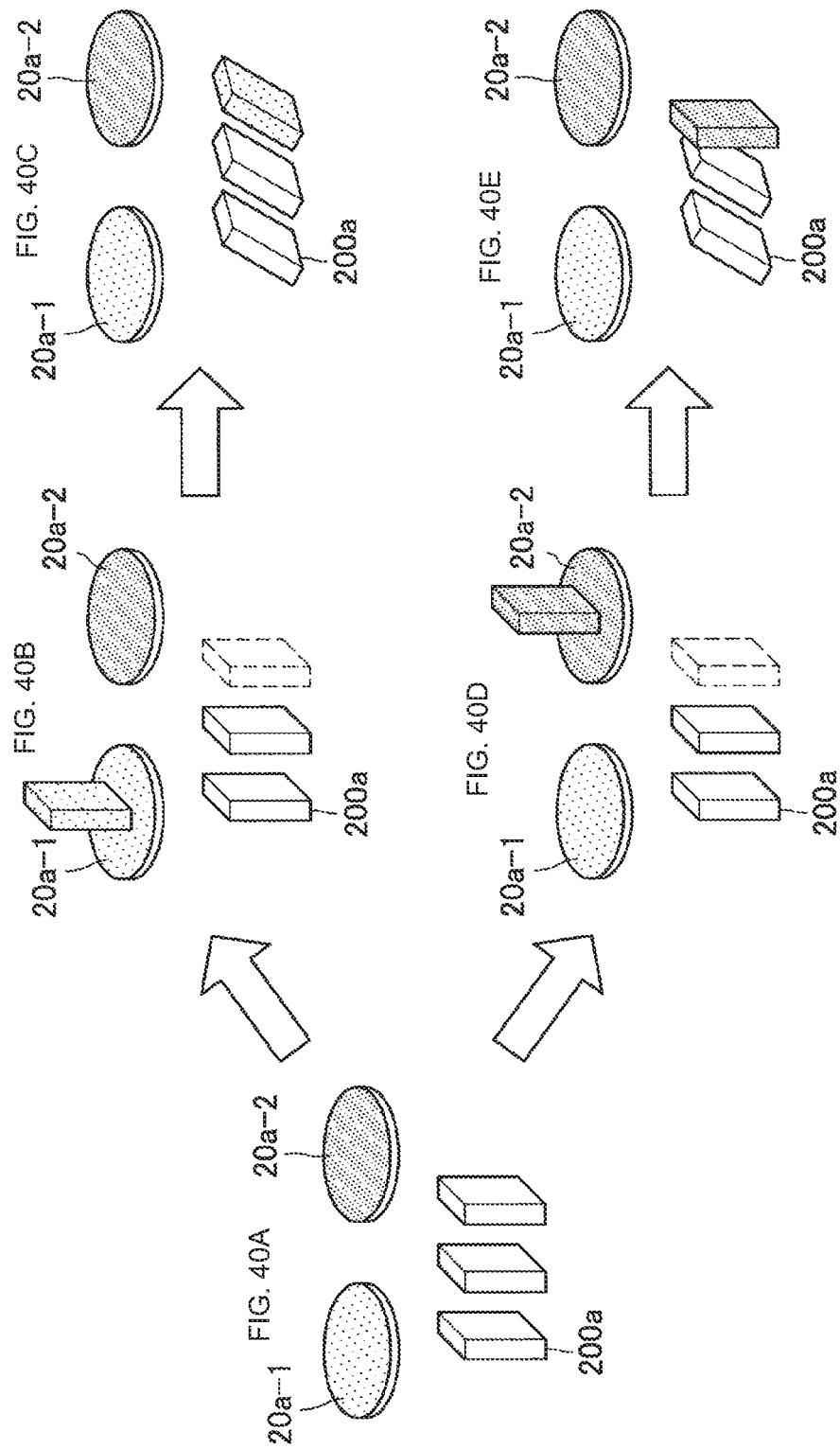

| REAL OBJECT NAME (RECOGNITION) | RECOGNITION INFORMATION | RECOGNITION METHOD | SINGLE/ PLURAL |
|---|---|---|---|
| DOMINO ROBOT | POSITION, POSTURE | DEPTH IMAGE PROCESSING | PLURAL |

FIG.43

| VIRTUAL OBJECT NAME | UPDATE INFORMATION | UPDATE METHOD | SINGLE/ PLURAL |
|---|---|---|---|
| VIRTUAL DOMINO | POSITION, POSTURE, MATERIAL | FOLLOW POSITION AND POSTURE OF DOMINO ROBOT AND UPDATE MATERIAL WHEN DOMINO ROBOT CONTACTS VIRTUAL WOODEN BOARD OR VIRTUAL IRON BOARD | PLURAL |

FIG.44

| REAL OBJECT NAME (CONTROL) | CONTROL TARGET | CONTROL INFORMATION | COMMUNICATION METHOD | SINGLE/ PLURAL |
|---|---|---|---|---|
| DOMINO ROBOT | MASS (BARYCENTER POSITION) | ELECTRO-MAGNET MAGNETIC FORCE | Bluetooth | PLURAL |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/045939 filed on Dec. 13, 2018, which claims priority benefit of Japanese Patent Application No. JP 2018-013356 filed in the Japan Patent Office on Jan. 30, 2018. Each of the above-referenced applications is hereby incorporated herein by reference in its entirety.

FIELD

The present disclosure relates to an information processing device, an information processing method, and a computer program.

BACKGROUND

Recently, devices and systems that use an augmented reality technology of augmenting a real space viewed from a user by displaying, in a superimposing manner, a virtual object on a real object existing in the real space have been actively developed.

For example, Patent Literature 1 below discloses a technology of displaying, near the real object based on a result of detection of a real object in an input image, a virtual object representing a function that can be presented to a user.

CITATION LIST

Patent Literature

Patent Literature 1: JP 2015-90524 A

SUMMARY

Technical Problem

However, the technology of Patent Literature 1 cannot control the behavior of a real object although the technology can control the content of a displayed virtual object. Thus, methods of feedback to a user are limited to methods that use images and sound, and it is impossible to perform physical feedback such as movement of the real object.

Thus, the present disclosure discloses an information processing device, an information processing method, and a computer program that are novel, modified, and capable of performing more appropriate physical feedback to a user.

Solution to Problem

According to the present disclosure, an information processing device is provided that includes: a recognition unit configured to recognize the physical relation between a real object and a first virtual object positioned on an identical surface; and a control unit configured to control the behavior of the real object based on the physical relation.

Moreover, according to the present disclosure, an information processing method is provided that executed by a computer, the method includes: recognizing the physical relation between a real object and a first virtual object positioned on an identical surface; and controlling the behavior of the real object based on the physical relation.

Moreover, according to the present disclosure, a computer program is provided that causes a computer to: recognize the physical relation between a real object and a first virtual object positioned on an identical surface; and control the behavior of the real object based on the physical relation.

Advantageous Effects of Invention

According to the present disclosure as described above, it is possible to perform more appropriate physical feedback to a user.

The above-described effect is not necessarily restrictive but may include, in addition to or in place of the above-described effect, any effect described in the present specification or another effect that could be understood from the present specification.

BRIEF DESCRIPTION OF DRAWINGS

FIGS. 11A, 11B, 11C, and 11D are diagrams for description of control of the behavior of a shoot ball robot 200a based on the physical relation between a virtual target ball 20a and the shoot ball robot 200a.

FIG. 12 is a diagram illustrating the content of definition by the recognition real object definition unit 116 in the billiard system.

FIG. 13 is a diagram illustrating the content of definition by the virtual object update rule definition unit 117 in the billiard system.

FIG. 14 is a flowchart illustrating an exemplary process of update processing of virtual object information in the billiard system.

FIG. 15 is a diagram illustrating the content of definition by the control real object definition unit 119 in the billiard system.

FIGS. 16A, 16B, 16C, and 16D are diagrams illustrating a specific example of video information in the billiard system.

FIGS. 17A, 17B, 17C, 17D, and 17E are diagrams illustrating an example in which control target update is performed through prediction of the behavior of the shoot ball robot 200*a* in the billiard system.

FIGS. 18A, 18B, 18C, 18D, 18E, and 18F are diagrams illustrating an example in which the behavior of the real object 200 is controlled based on an environment represented by a virtual object 20.

FIGS. 20A, 20B, 20C, and 20D is a are diagrams illustrating an example in which the embodiment of the present disclosure is applied to a bouldering system.

FIGS. 21A and 21B are diagrams illustrating the principle of operation of a rock robot 200*a* in the bouldering system.

FIG. 22 is a diagram illustrating the content of definition by the recognition real object definition unit 116 in the bouldering system.

FIG. 23 is a diagram illustrating the content of definition by the virtual object update rule definition unit 117 in the bouldering system.

FIG. 25 is a flowchart illustrating an exemplary process of control target update processing of the rock robot 200*a* in the bouldering system.

FIG. 26 is a diagram illustrating the content of definition by the control real object definition unit 119 in the bouldering system.

FIGS. 27A, 27B, and 27C are diagrams illustrating an example in which the embodiment of the present disclosure is applied to a cycling system.

FIG. 28 is a diagram illustrating the content of definition by the recognition real object definition unit 116 in the cycling system.

FIG. 29 is a diagram illustrating the content of definition by the virtual object update rule definition unit 117 in the cycling system.

FIG. 30 is a diagram illustrating the content of definition by the control real object definition unit 119 in the cycling system.

FIGS. 33A, 33B, and 33C are diagrams illustrating an example in which the embodiment of the present disclosure is applied to a condiment handling system.

FIG. 36 is a diagram illustrating the content of definition by the recognition real object definition unit 116 in the condiment handling system.

FIG. 37 is a diagram illustrating the content of definition by the virtual object update rule definition unit 117 in the condiment handling system.

FIGS. 40A, 40B, 40C, 40D, and 40E are diagrams illustrating an example in which the embodiment of the present disclosure is applied to a domino system.

FIGS. 41A, 41B, and 41C are diagrams illustrating the principle of change of the barycenter of a domino robot 200*a* in the domino system.

FIG. 43 is a diagram illustrating the content of definition by the virtual object update rule definition unit 117 in the domino system.

FIG. 44 is a diagram illustrating the content of definition by the control real object definition unit 119 in the domino system.

DESCRIPTION OF EMBODIMENTS

Preferable embodiments of the present disclosure will be described below in detail with reference to the accompanying drawings. In the present specification and the drawings, components having functional configurations identical to each other in effect are denoted by an identical reference sign and duplicate description thereof will be omitted.

The description is performed in the following order.
1. Embodiment
1.1. Overview
1.2. Exemplary functional configuration of information processing device 100
1.3. Exemplary functional configuration of real object 200
1.4. Process of processing performed by information processing device 100
2. Examples
2.1. Billiard system
2.2. Bouldering system
2.3. Cycling system
2.4. Condiment handling system
2.5. Domino system
3. Exemplary hardware configuration of information processing device 100
4. Conclusion
<1. Embodiment>
(1.1. Overview)
The following first describes the overview of an embodiment of the present disclosure.

Figure 1:
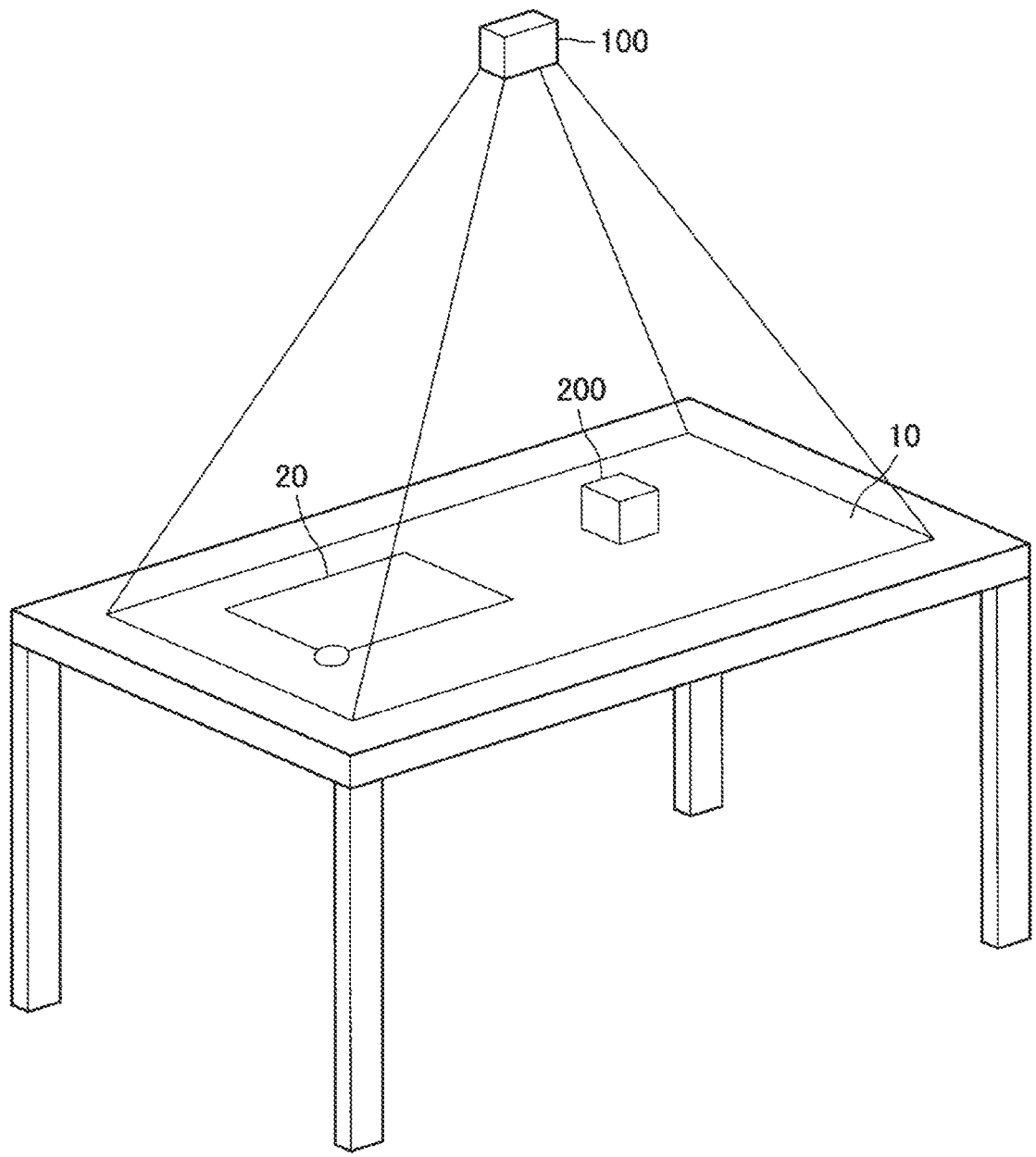
FIG. 1 is a diagram illustrating an exemplary configuration of an information processing system according to the present embodiment.

As illustrated in FIG. 1, an information processing system according to the present embodiment includes an information processing device 100, and a real object 200 positioned on an identical projection surface 10 together with a virtual object 20 projected by the information processing device 100.

The information processing device 100 is a device having a function to recognize the physical relation between the virtual object 20 (first virtual object) and the real object 200 positioned on the identical projection surface 10 and control the behavior of the real object 200 based on the physical relation.

More specifically, as illustrated in FIG. 1, the information processing device 100 is installed above the projection surface 10 to capture an image of the entire projection surface 10. The information processing device 100 recognizes the real object 200 positioned on the projection surface 10 by analyzing a captured input image and projects the virtual object 20 onto the projection surface 10 based on the real object 200. For example, the information processing device 100 recognizes a billiard shoot ball robot as the real object 200 and projects a virtual target ball as the virtual object 20 onto the projection surface 10.

Then, the information processing device 100 recognizes, through analysis of the input image and the like, the physical relation between the virtual object 20 and the real object 200 positioned on the identical surface and controls the behavior of the real object 200 based on the physical relation. For example, the real object 200 recognizes an event such as collision of the virtual target ball with the shoot ball robot and performs control, for example, to roll the shoot ball robot. Accordingly, the information processing device 100 can perform more appropriate physical feedback to a user and provide an impression of fuzziness of the boundary between a real space and a virtual space to the user.

The information processing device 100 controls the behavior of the real object 200 by controlling the position or a physical quantity of the real object 200. For example, when the virtual target ball collides with the shoot ball robot, the information processing device 100 controls the rolling behavior of the shoot ball robot by controlling the position and speed as a physical quantity of the shoot ball robot. The physical quantity may include the acceleration, the mass, the density, the length, the friction coefficient, the elastic force, the temperature, or the like in addition to the speed, but is not limited thereto.

The physical relation between the virtual object 20 and the real object 200 is not limited to collision between the virtual object 20 and the real object 200. For example, the physical relation may include contact or the positional relation between the virtual object 20 and the real object 200.

The real object 200 is a device, the behavior of which is controlled by the information processing device 100. More specifically, the information processing device 100 determines the method of controlling the behavior of the real object 200, and then generates control information and transmits the control information to the real object 200. Accordingly, the real object 200 receives the control information and behaves based on the control information. For example, the shoot ball robot as the real object 200 rolls based on information related to position and speed included in the control information.

The virtual object 20 is an object projected (or displayed) on the projection surface 10 by the information processing device 100. The content of the virtual object 20 is not particularly limited. More specifically, the content of the virtual object 20 may be determined based on processing of a software application being activated and the like. Although the above description is made on the example in which the virtual object 20 (the virtual target ball) acts on the real object 200 (shoot ball robot), the present invention is not limited thereto, but the real object 200 may act on the virtual object 20. For example, the virtual target ball may be rolled upon collision with the shoot ball robot.

The projection surface 10 may be any surface onto which the information processing device 100 can project video. For example, the projection surface 10 may be a surface having irregularities, a curved surface, or a spherical surface. The material of the projection surface 10 is not particularly limited. For example, the material of the projection surface 10 may be wood, rubber, metal, or plastic. Since the projection surface 10 may be any surface and made of any material as described above, the user can use the present information processing system as long as the information processing device 100 can be installed above an optional surface.

Figure 2A:
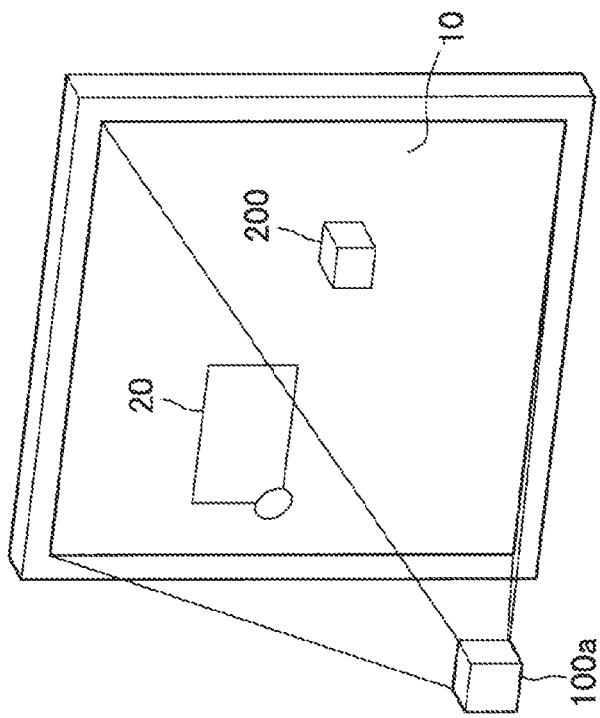
FIGS. 2A and 2B are diagrams illustrating variations of the exemplary configuration of the information processing system according to the present embodiment.
Figure 2B:
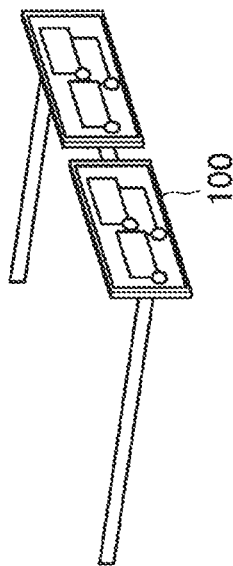

The aspect of the information processing system according to the present embodiment is not limited to the above description. For example, various kinds of processing of the information processing device 100 in the above description may be achieved by an external device (including the real object 200). As illustrated in FIG. 2A, the projection surface 10 may be a wall surface. This configuration is same as that of FIG. 1 except that the projection surface 10 is the wall surface and the information processing device 100 is installed at a position where the information processing device 100 can perform projection onto the wall surface. As illustrated in FIG. 2B, the information processing device 100 may be a glass wearable terminal (including a see-through head-mounted display). In this case, the information processing device 100 displays the virtual object 20 at lenses of the glass wearable terminal to display, in a superimposing manner, the virtual object 20 onto the real object 200 visually recognized through the lenses. The aspects of FIGS. 2A and 2B may be flexibly modified in accordance with specifications and operations.

(1.2. Exemplary Functional Configuration of the Information Processing Device 100)

The above description is made on the overview of the embodiment of the present disclosure. The following describes an exemplary functional configuration of the information processing device 100 with reference to FIG. 3.

Figure 3:
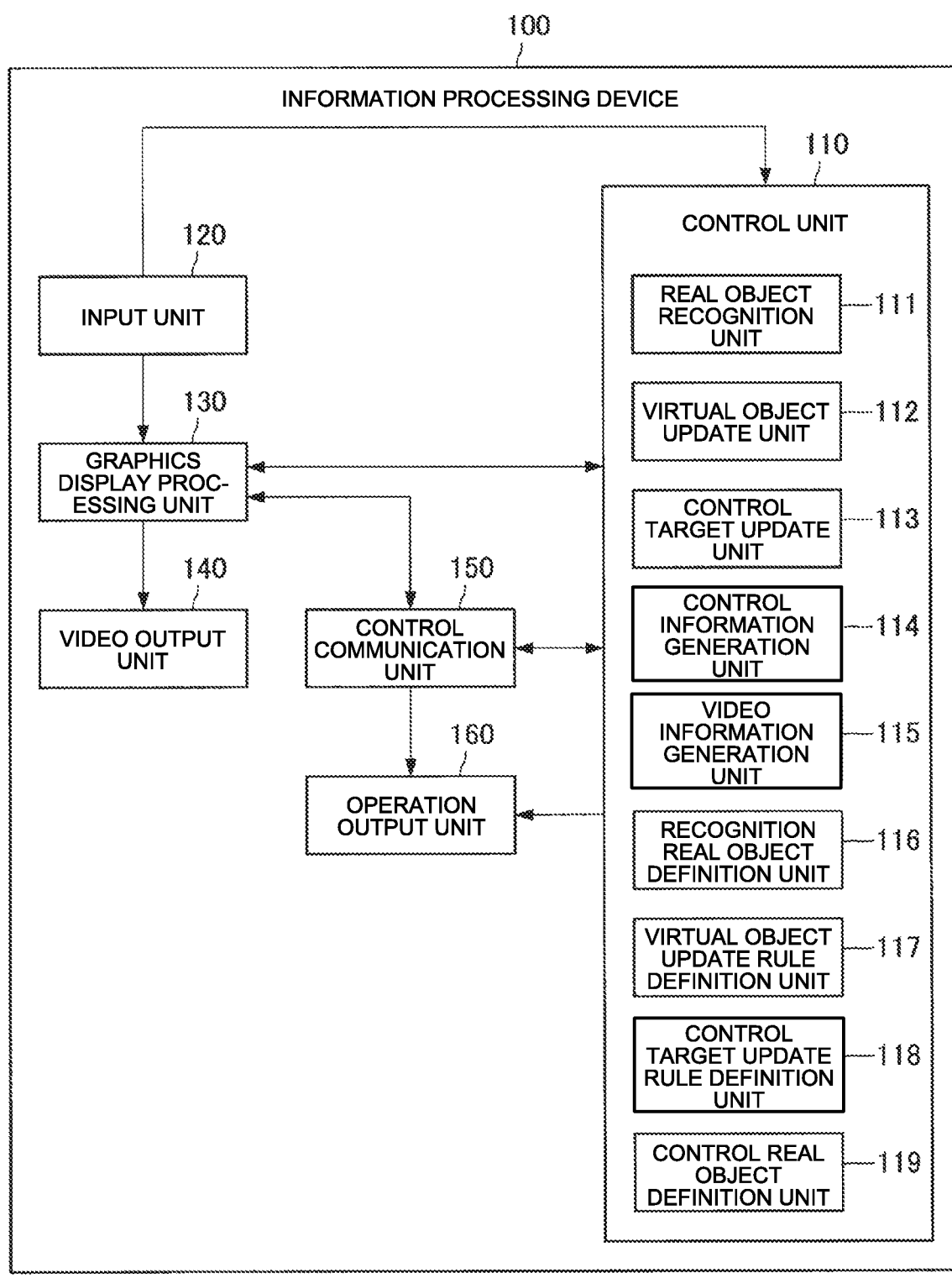
FIG. 3 is a block diagram illustrating an exemplary functional configuration an information processing device 100.

As illustrated in FIG. 3, the information processing device 100 includes a control unit 110, an input unit 120, a graphics display processing unit 130, a video output unit 140, a control communication unit 150, and an operation output unit 160.

(Control Unit 110)

The control unit 110 is a functional component configured to collectively control the entire processing performed by the information processing device 100. For example, the control unit 110 can control activation and stop of each functional component based on an input from the input unit 120. The content of control by the control unit 110 is not particularly limited. For example, the control unit 110 may achieve processing (such as operating system (OS) processing) typically performed in a general-purpose computer, a personal computer (PC), a tablet PC, a smartphone, or the like.

The control unit 110 is also a functional component configured to perform processing related to the real object 200 and the virtual object 20. The control unit 110 is also a functional component configured to function as a recognition unit configured to recognize the physical relation between the virtual object 20 (first virtual object) and the real object 200. As illustrated in FIG. 3, the control unit 110 includes a real object recognition unit 111, a virtual object update unit 112, a control target update unit 113, a control information generation unit 114, a video information generation unit 115, a recognition real object definition unit 116, a virtual object update rule definition unit 117, a control target update rule definition unit 118, and a control real object definition unit 119.

(Real Object Recognition Unit 111)

The real object recognition unit 111 is a functional component configured to recognize the real object 200. More specifically, the real object recognition unit 111 acquires various kinds of sensor information such as an input image from the input unit 120, and acquires information (such as a feature amount) related to the real object 200 as a recognition target from the recognition real object definition unit 116. Then, for example, the real object recognition unit 111 recognizes the real object 200 included in in the input image through, for example, comparison between the feature amount of the real object 200 included in the input image and the feature amount of the real object 200 as a recognition target. This processing is merely exemplary, and the content of the recognition processing of the real object 200 is not limited thereto. For example, the real object recognition unit 111 may recognize the real object 200 through, for example, analysis of optional sensor information other than the input image. Then, the real object recognition unit 111 updates information (hereinafter, referred to as "real object information") related to the recognized real object 200. The real object information will be described later in detail.

(Virtual Object Update Unit 112)

The virtual object update unit 112 is a functional component configured to update the virtual object 20. More specifically, the virtual object update unit 112 acquires the real object information from the real object recognition unit 111, and acquires information related to an update rule of the virtual object 20 from the virtual object update rule definition unit 117. Then, the virtual object update unit 112 updates information (hereinafter, also referred to as "virtual object information") related to the virtual object 20 based on these pieces of information. For example, when the shoot ball robot collides with the virtual target ball, the virtual object update unit 112 updates the virtual object information of the virtual target ball based on information related to the update rule of the virtual target ball acquired from the virtual object update rule definition unit 117. The virtual object update unit 112 does not need to use the real object information in the virtual object information update processing. The virtual object information will be described later in detail.

(Control Target Update Unit 113)

The control target update unit 113 is a functional component configured to update a control target of the real object 200. More specifically, the control target update unit 113 acquires the real object information from the real object recognition unit 111, acquires the virtual object information from the virtual object update unit 112, and acquires information related to an update rule of the control target of the real object 200 from the control target update rule definition unit 118. Then, the control target update unit 113 updates the control target based on these pieces of information. The control target is information related to the behavior of the real object 200 controlled based on the physical relation between the virtual object 20 and the real object 200, and is, for example, a target value of the position or physical quantity (such as the speed, the acceleration, the mass, the density, the length, the friction coefficient, the elastic force, or the temperature) of the real object 200. For example, the control target may be a position to which or a speed at which the shoot ball robot should move upon collision with the virtual target ball. The control target update unit 113 provides information related to the updated control target to the control information generation unit 114. The content of the control target and the content of the control target update processing are not limited to those described above. For example, the control target update unit 113 does not need to use the real object information or the virtual object information in the control target update processing.

(Control Information Generation Unit 114)

The control information generation unit 114 is a functional component configured to generate the control information. More specifically, the control information generation unit 114 acquires information related to the real object 200 to be controlled from the control real object definition unit 119, and acquires information related to the updated control target from the control target update unit 113. Then, the control information generation unit 114 generates the control information for controlling the real object 200 based on these pieces of information.

The control information is not particularly limited but may be any information used for control of the real object 200. For example, the control information may include information (such as the target value of the position or the physical quantity (such as the speed, the acceleration, the mass, the density, the length, the friction coefficient, the elastic force, or the temperature)) related to the control target. A programming language in which the control information is written is not particularly limited. The control information generation unit 114 provides the generated control information to the real object 200 (or an external device that acts on the real object 200) through the control communication unit 150. Accordingly, the behavior of the real object 200 is controlled. The method of the control information generation processing is not limited to that described above.

(Video Information Generation Unit 115)

The video information generation unit 115 is a functional component configured to generate video information to be projected onto the projection surface 10. More specifically, the video information generation unit 115 acquires the updated virtual object information from the virtual object update unit 112, and generates the video information for projecting the virtual object 20 based on the information. Targets for which the video information generation unit 115 generates the video information are not limited to the real object 200 and the virtual object 20 to be acted on. More specifically, the video information generation unit 115 may generate the video information for any optional object that can be projected onto the projection surface 10. For example, the video information generation unit 115 may generate the video information for an object other than the virtual target ball, such as a wall surface, a pocket, or the like of a billiard table. The video information generation unit 115 may generate the video information that causes various visual effects. In addition, the video information generation unit 115 may perform, for example, processing of conversion from the coordinate system of the virtual space to the coordinate system of the real space.

(Recognition Real Object Definition Unit 116)

The recognition real object definition unit 116 is a functional component configured to define the real object 200 as a recognition target. More specifically, the recognition real object definition unit 116 determines the real object 200 as a recognition target based on, for example, processing of a software application being activated. Then, the recognition real object definition unit 116 provides information (for example, the feature amount) used for recognition of the real object 200 to the real object recognition unit 111. Accordingly, the recognition processing of the real object 200 by the real object recognition unit 111 is achieved.

Figures 4, 5, 6, 7:
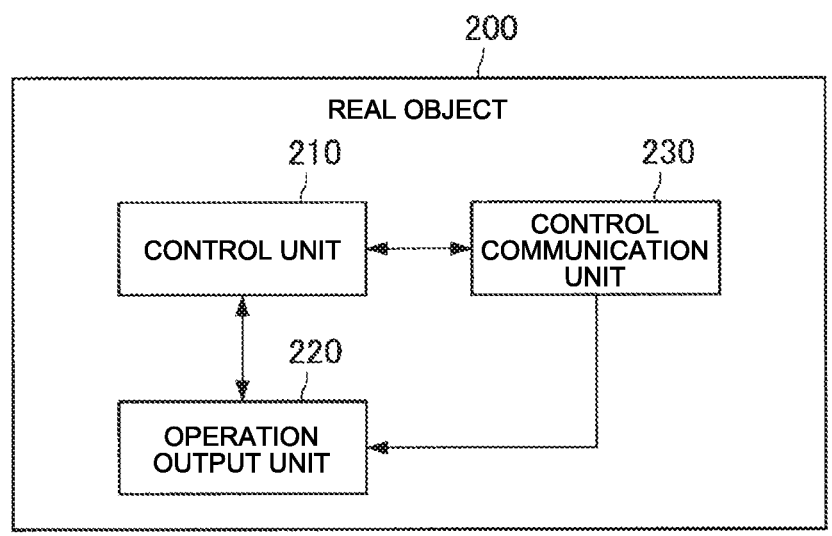
FIG. 4 is a diagram illustrating the content of definition by a recognition real object definition unit 116.
FIG. 5 is a diagram illustrating the content of definition by a virtual object update rule definition unit 117.
FIG. 6 is a diagram illustrating the content of definition by a control real object definition unit 119.
FIG. 7 is a block diagram illustrating an exemplary functional configuration a real object 200.

Information defined by the recognition real object definition unit 116 may be expressed, for example, as illustrated in FIG. 4. More specifically, the information defined by the recognition real object definition unit 116 may include information related to the name, recognition information, recognition method, and single/plural of the real object 200. The recognition information is information as a recognition processing target among information (for example, the position, posture, physical quantity (such as the speed, the acceleration, the mass, the density, the length, the friction coefficient, the elastic force, or the temperature), or the like of the real object 200) related to the real object 200. A specific example thereof to be described later. The information defined by the recognition real object definition unit 116 is not limited to the content of FIG. 4.

(Virtual Object Update Rule Definition Unit 117)

The virtual object update rule definition unit 117 is a functional component configured to define the update rule of the virtual object 20. More specifically, the virtual object update rule definition unit 117 determines the update rule of the virtual object 20 based on processing of a software application being activated and the like. Then, the virtual object update rule definition unit 117 provides the update rule of information related to the virtual object 20 to the virtual object update unit 112. Accordingly, the update processing of the virtual object 20 by the virtual object update unit 112 is achieved.

Information defined by the virtual object update rule definition unit 117 may be expressed, for example, as illustrated in FIG. 5. More specifically, the information defined by the virtual object update rule definition unit 117 may include information related to the name, update information, update method, and single/plural of the virtual object 20. The update information is information as an update processing target among information (such as the position, posture, physical quantity (for example, the speed, the acceleration, the mass, the density, the length, the friction coefficient, the elastic force, or the temperature) of the virtual object 20) related to the virtual object 20. A specific example thereof will be described later. The information defined by the virtual object update rule definition unit 117 is not limited to the content of FIG. 5.

(Control Target Update Rule Definition Unit 118)

The control target update rule definition unit 118 is a functional component configured to define the update rule of the control target of the real object 200. More specifically, the control target update rule definition unit 118 determines the update rule of the control target of the real object 200 based on processing of a software application being activated and the like. Then, the control target update rule definition unit 118 provides information related to the update rule of the control target to the control target update unit 113. Accordingly, the update processing of the control target of the real object 200 by the control target update unit 113 is achieved. The content of the definition processing of the control target update rule is not limited to that described above.

(Control Real Object Definition Unit 119)

The control real object definition unit 119 is a functional component configured to define the real object 200 to be controlled by the information processing device 100. More specifically, the control real object definition unit 119 determines the real object 200 to be controlled based on the physical relation with the virtual object 20. For example, the control real object definition unit 119 determines, as the real object 200 to be controlled, the real object 200 having collided with the virtual object 20. Then, the control real object definition unit 119 provides information related to the real object 200 to be controlled to the control information generation unit 114. Accordingly, the control information generation processing by the control information generation unit 114 is achieved.

Information defined by the control real object definition unit 119 may be expressed, for example, as illustrated in FIG. 6. More specifically, the information defined by the control real object definition unit 119 may include information related to the name, control target, control information, communication method, and single/plural of the real object 200. The control target is information to be controlled among information (such as the position, posture, or physical quantity (for example, the speed, the acceleration, the mass, the density, the length, the friction coefficient, the elastic force, or the temperature) of the real object 200 to be controlled) related to the real object 200 to be controlled. The control information is information used to control the control target. The communication method is a communication method used for processing of transmission of the control information to the real object 200. A specific example thereof will be described later. The information defined by the control real object definition unit 119 is not limited to the content of FIG. 6.

(Input Unit 120)

The input unit 120 is a functional component configured to receive, as an input, the projection surface 10, the real object 200 on the projection surface 10, an operation (for example, a gesture) by the user, the state of the user, or the like. For example, the input unit 120 includes an image sensor and can generate an input image by capturing an image of the entire projection surface 10. The input unit 120 may generate an input image of a visible light band or may generate an input image of a specification wavelength band (for example, an infrared light band) through a multispectral filter that transmits light of specific wavelengths. The input unit 120 may generate an input image from which polarization is removed through a polarization filter.

The input unit 120 may include a depth sensor to generate a depth image. The kind and sensing scheme of the depth sensor are not particularly limited, and for example, the depth sensor may be a stereo camera and the sensing scheme may be a time-of-flight (TOF) scheme or a structured-light scheme.

The input unit 120 may include a touch sensor capable of detecting a touch operation on the projection surface 10 by the user. Accordingly, the user can perform desired inputting by touching the projection surface 10. The kind and sensing scheme of the touch sensor are not particularly limited as well. For example, the projection surface 10 may include a touch panel to detect a touch, or a touch may be detected through analysis of an input image generated by the above-described image sensor.

A sensor included in the input unit 120 is not limited to the above-described sensors. For example, the input unit 120 may include an optional sensor such as a sound sensor, a temperature sensor, an illuminance sensor, a position sensor (such as the Global Navigation Satellite System (GNSS) sensor), or an atmospheric pressure sensor. The input unit 120 provides input information to the control unit 110 and the graphics display processing unit 130.

(Graphics Display Processing Unit 130)

The graphics display processing unit 130 is a functional component configured to perform processing related to graphics display. More specifically, the graphics display processing unit 130 outputs graphics to be projected onto the projection surface 10 by inputting the video information provided by the video information generation unit 115 and an input provided by the input unit 120 to an optional software application (such as a graphics application). The graphics display processing unit 130 provides information related to the output graphics to the video output unit 140. Accordingly, the projection processing by the video output unit 140 is achieved.

(Video Output Unit 140)

The video output unit 140 is a functional component configured to output visual information to the user. For example, the video output unit 140 includes a projection unit such as a projector and can project, onto the projection surface 10, the graphics output from the graphics display processing unit 130. The video output unit 140 may include, for example, a display unit such as various displays (such as a liquid crystal screen, a touch-panel display, and a head-mounted display). The output unit is not limited to that described above.

(Control Communication Unit 150)

The control communication unit 150 is a functional component configured to perform communication of the control information with the external device (in other words, the control communication unit 150 is a functional component configured to function as a transmission unit configured to transmit the control information to the external device). More specifically, the control communication unit 150 transmits, to the real object 200 (or the external device that acts on the real object 200), the control information provided by the control information generation unit 114. Accordingly, the behavior of the real object 200 is controlled. When the control information generation processing is performed by the external device, the control communication unit 150 may receive the control information from the external device. The situation in which communication is performed by the control communication unit 150 or the content of the communication is not limited to that described above.

For example, the method or line type of the communication by the control communication unit 150 is not particularly limited. For example, the communication by the control communication unit 150 may be achieved through a wireless communication network such as a Wi-Fi (registered trademark) network, a Bluetooth (registered trademark) network, or an infrared communication. The communication by the control communication unit 150 may be achieved through a dedicated network such as an internet protocol-virtual private network (IP-VPN). The communication by the control communication unit 150 may be achieved through, for example, a public network such as the Internet, a phone network, or a satellite communication network, various local area networks (LAN) including an Ethernet (registered trademark), and a wide area network (WAN). When communication is achieved by video (light beam) projected onto the projection surface 10, the control communication unit 150 may be omitted as appropriate.

(Operation Output Unit 160)

The operation output unit 160 is a functional component configured to perform force application to the real object 200. More specifically, unlike the aspect in which the real object 200 is provided with the control information to control the behavior of the real object 200, the operation output unit 160 may control the behavior of the real object 200 by acting on the real object 200. For example, the operation output unit 160 may include a truck capable of moving in a front-back direction and rotating about an axis vertical to a movement plane, a truck capable of moving and rotating in all directions, or the like and may perform force application to the real object 200 by controlling these trucks. The operation output unit 160 may include a belt conveyer configured to operate a contact surface of the real object 200, a linear actuator configured to operate a wire connected with the real object 200, or the like and may perform force application to the real object 200 by controlling these devices. The operation output unit 160 may include a wind generation device, a magnetic force generation device, an ultrasonic wave generation device, or the like and may perform force application to the real object 200 by controlling these devices. The above-described configuration may be included in the external device other than the information processing device 100 to achieve force application to the real object 200.

The exemplary functional configuration of the information processing device 100 is described above. The functional configuration described above with reference to FIG. 3 is merely exemplary, and the functional configuration of the information processing device 100 is not limited to the example. For example, the information processing device 100 does not necessarily need to include all components illustrated in FIG. 3. The functional configuration of the information processing device 100 may be flexibly modified in accordance with specifications and operations.

(1.3. Exemplary Functional Configuration of Real Object 200)

The above description is made on the exemplary functional configuration of the information processing device 100. The following describes an exemplary functional configuration of the real object 200 with reference to FIG. 7.

As illustrated in FIG. 7, the real object 200 includes a control unit 210, an operation output unit 220, and a control communication unit 230.

(Control Unit 210)

The control unit 210 is a functional component configured to collectively control the entire processing performed by the real object 200. For example, the control unit 210 can perform control and the like of the operation output unit 220 based on the control information acquired from the outside. The content of control by the control unit 210 is not limited thereto. For example, the control unit 210 may achieve processing (such as OS processing) typically performed in a general-purpose computer, a PC, a tablet PC, a smartphone, or the like.

(Operation Output Unit 220)

The operation output unit 220 is a functional component configured to perform force application to the real object 200. More specifically, the operation output unit 220 may include a drive unit such as an actuator or a motor and perform force application to the real object 200 by controlling the drive unit. Accordingly, the real object 200 can be operated based on the control information provided by the information processing device 100. The kind of the drive unit included in the operation output unit 220 is not particularly limited.

(Control Communication Unit 230)

The control communication unit 230 is a functional component configured to perform communication of the external device with the control information. More specifically, the control communication unit 230 receives the control information from the information processing device 100. The control communication unit 230 provides the received control information to the control unit 210 and the operation output unit 220. The situation in which communication is performed by the control communication unit 230 or the content of the communication is not limited thereto. In addition, similarly to the control communication unit 150, the method or line type of communication by the control communication unit 230 is not particularly limited.

The above description is made on the exemplary functional configuration of the real object 200. The above-described functional configuration described with reference to FIG. 7 is merely exemplary, and the functional configuration of the real object 200 is not limited to the example. For example, the real object 200 does not necessarily need to include all components illustrated in FIG. 7. The functional configuration of the real object 200 may be flexibly modified in accordance with specifications and operations.

(1.4. Process of Processing Performed by Information Processing Device 100)

The above description is made on the exemplary functional configuration of the real object 200. The following describes the process of processing performed by the information processing device 100.

Figure 8:
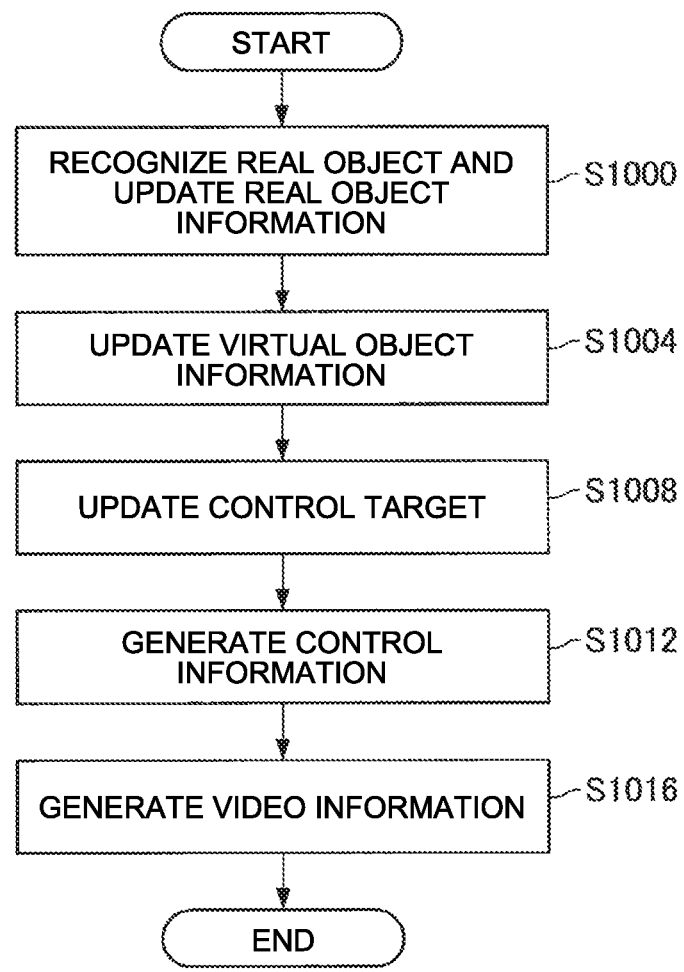
FIG. 8 is a flowchart illustrating an exemplary process of processing performed by the information processing device 100.

The following first describes an exemplary process of processing from acquisition of the sensor information to generation of the video information by the information processing device 100 with reference to FIG. 8.

At step S1000, the real object recognition unit 111 acquires various kinds of sensor information such as an input image from the input unit 120 and acquires information related to the real object 200 as a recognition target from the recognition real object definition unit 116. Then, the real object recognition unit 111 recognizes the real object 200 based on these pieces of information and updates the real object information.

At step S1004, the virtual object update unit 112 acquires the real object information from the real object recognition unit 111 and acquires the update rule of information related to the virtual object 20 from the virtual object update rule definition unit 117. Then, the real object recognition unit 111 updates the virtual object information based on these pieces of information.

At step S1008, the control target update unit 113 acquires the real object information from the real object recognition unit 111, acquires the virtual object information from the virtual object update unit 112, and acquires information related to the update rule of the control target of the real object 200 from the control target update rule definition unit 118. Then, the control target update unit 113 updates the control target based on these pieces of information.

At step S1012, the control information generation unit 114 acquires information related to the real object 200 to be controlled from the control real object definition unit 119 and acquires information related to the updated control target from the control target update unit 113. Then, the control information generation unit 114 generates the control information for controlling the real object 200 based on these pieces of information.

At step S1016, the video information generation unit 115 acquires the updated virtual object information from the virtual object update unit 112 and generates the video information for projecting the virtual object 20 based on the information. As described above, the video information generation unit 115 may generate the video information that causes various visual effects and may perform, for example, processing of conversion from the coordinate system of the virtual space to the coordinate system of the real space.

Accordingly, the series of pieces of processing by the information processing device 100 ends. After the above-described processing, processing of transmitting the control information to the real object 200, video output processing based on the video information, and the like are performed as appropriate.

Figure 9:
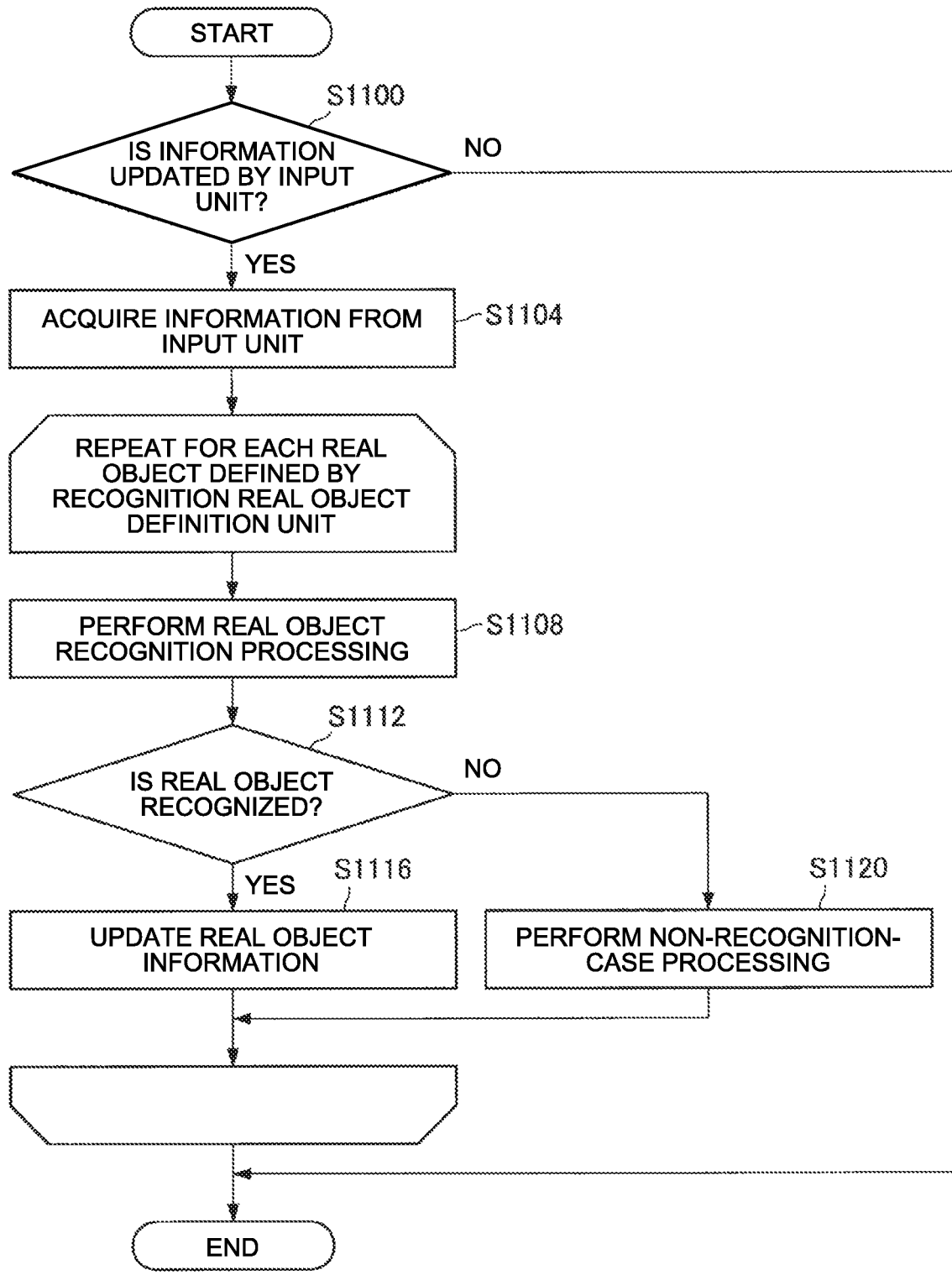
FIG. 9 is a flowchart illustrating an exemplary process of recognition processing of the real object 200 performed by a real object recognition unit 111.

The recognition processing of the real object 200 by the real object recognition unit 111, which is described at step S1000 in FIG. 8, is common to examples described below, and thus a specific example thereof will be described below with reference to FIG. 9. The processing described at the other steps in FIG. 8 is different between the examples in some cases and thus will be described in each example.

When various kinds of sensor information such as an input image are updated by the input unit 120 at step S1100 (Yes at step S1100), the real object recognition unit 111 acquires the input image and the like from the input unit 120 at step S1104. When various kinds of sensor information such as an input image are not updated by the input unit 120 at step S1100 (No at step S1100), the processing ends.

Then, the real object recognition unit 111 updates the real object information by repeating the processing at steps S1108 to S1120 for each real object defined by the recognition real object definition unit 116. More specifically, at step S1108, the real object recognition unit 111 performs the recognition processing of the real object 200 based on the input image and the like, and the information related to the real object 200 as a recognition target and acquired from the recognition real object definition unit 116.

When the real object recognition unit 111 has recognized a real object from the input image and the like (Yes at step S1112), the real object recognition unit 111 updates the real object information at step S1116. When the real object recognition unit 111 could not recognize a real object from the input image and the like (No at step S1112), the real object recognition unit 111 performs non-recognition-case processing at step S1120. The content of the non-recognition-case processing is not particularly limited. For example, the real object recognition unit 111 may perform recording of processing history information or the like as the non-recognition-case processing.

<2. Examples>

The above description is made on the embodiment of the present disclosure. The above-described embodiment of the present disclosure is applicable to various examples. The following describes various examples to which the embodiment of the present disclosure is applied.

(2.1. Billiard System)

Figure 10:
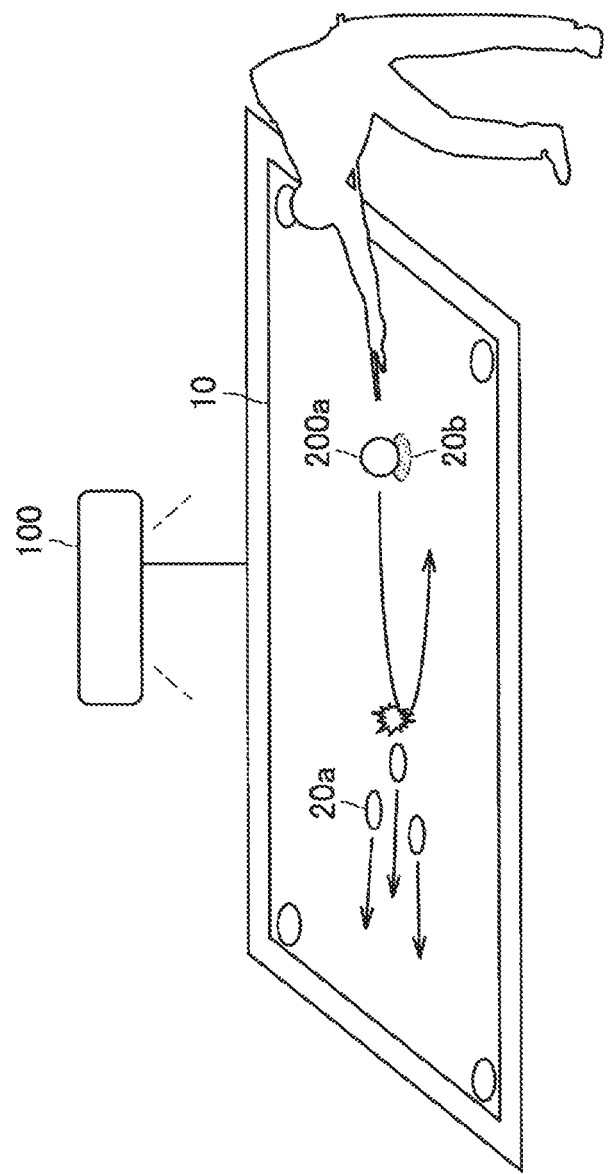
FIG. 10 is a diagram illustrating an example in which the embodiment of the present disclosure is applied to a billiard system.

The following first describes an example in which the embodiment of the present disclosure is applied to a billiard system. FIG. 10 is a schematic diagram of the billiard system. As illustrated in FIG. 10, the information processing device 100 is installed above an optional table at which the projection surface 10 is formed, and a shoot ball robot 200a as a real object 200 that is wirelessly controllable and has a spherical shape and a size equivalent to that of a billiard ball is disposed on the projection surface 10. A target ball, pockets, wall surfaces, and the like illustrated on the projection surface 10 in FIG. 10, other than the shoot ball robot 200a, are all virtual objects 20. In other words, any object other than the shoot ball robot 200a is projected as a virtual object 20 by the information processing device 100.

In the present example, the behavior of the shoot ball robot 200a is controlled based on the physical relation between a virtual target ball 20a (first virtual object) and the shoot ball robot 200a. More specific description will be given below with reference to FIGS. 11A, 11B, 11C, and 11D. In the present example, a virtual shoot ball 20b that is a virtual object 20 (second virtual object) corresponding to the shoot ball robot 200a is used for processing. More specifically, as illustrated in 11A of FIG. 11A, when a user places the shoot ball robot 200a on the projection surface 10, the virtual shoot ball 20b corresponding to the shoot ball robot 200a is disposed at a position corresponding to the shoot ball robot 200a.

Then, as illustrated in FIG. 11B, when the user cues the shoot ball robot 200a, the virtual shoot ball 20b starts moving, following the shoot ball robot 200a at a speed equal to that of the shoot ball robot 200a. Thereafter, the virtual shoot ball 20b behaves, based on physical simulation, in accordance with the laws of physics same as those in the real space. More specifically, the virtual shoot ball 20b moves on the table while receiving influences such as friction with the table and collision with any other virtual object 20 (for example, the virtual target ball 20a, a pocket, or a wall surface). After having been cued by the user, the shoot ball robot 200a behaves, following the virtual shoot ball 20b as illustrated in FIG. 11C (in other words, the shoot ball robot 200a as a real object 200 behaves in accordance with the behavior of the virtual shoot ball 20b as the second virtual object). For example, when the direction of the virtual shoot ball 20b is changed upon collision with another virtual object 20, the direction of the shoot ball robot 200a is changed in the same manner.

Then, when the virtual shoot ball 20b stops, the shoot ball robot 200a stops at a substantially identical position. Here, the shoot ball robot 200a cannot stop at a position substantially identical to that of the virtual shoot ball 20b due to the shape of the table, the performance of the shoot ball robot 200a, and the like in some cases. In such a case, as illustrated in FIG. 11D, the virtual shoot ball 20b moves to a position substantially identical to that of the shoot ball robot 200a. Accordingly, the position of the shoot ball robot 200a is matched with the position of the virtual shoot ball 20b. The above-described processing is repeated to achieve a billiard game using the present system. Accordingly, the user can have experience at the same quality as that of normal billiards although any ball other than the shoot ball robot 200a touched by the user is a virtual object 20.

The following describes processing performed by each functional component of the information processing device 100. First, the real object recognition unit 111 of the information processing device 100 performs the above-described real object recognition processing (step S1000 in FIG. 8). For example, as illustrated in FIG. 12, the real object recognition unit 111 performs depth image processing to recognize the position and speed of the shoot ball robot 200a in real time. Since the shoot ball robot 200a has a spherical shape, the real object recognition unit 111 may specify the position of the shoot ball robot 200a based on a circle detection method through Hough transform. Alternatively, the real object recognition unit 111 may specify the position of the shoot ball robot 200a based on another detection method. Information recognized by the real object recognition unit 111 is not limited to the content of FIG. 12.

The virtual object update unit 112 performs the virtual object information update processing (step S1004 in FIG. 8). More specifically, the virtual object update unit 112 uses a virtual object (second virtual object) corresponding to the shoot ball robot 200a in processing. Specifically, as illustrated in FIG. 13, the virtual object update unit 112 manages not only the virtual target ball 20a but also the virtual shoot ball 20b as the virtual object information, and calculates the positions and speeds of the virtual target ball 20a and the virtual shoot ball 20b in a three-dimensional coordinate system through physical simulation. Various physical parameters such as masses, friction coefficients, and reflection coefficients are input to the physical simulation, and a frame work (for example, Box2D or Bullet Physics) that can calculate the behaviors of rigid bodies at collision and the like can be used, but the present invention is not limited thereto.

In the present example, the behavior of the virtual shoot ball 20b is determined upon inputting of the position and speed of the shoot ball robot 200a. The following describes a specific example of the virtual object information update processing performed by the virtual object update unit 112 with reference to FIG. 14.

When the processing starts right after the shoot ball robot 200a starts moving (in other words, when the processing starts right after the user cues the shoot ball robot 200a) (Yes at step S1200), the virtual object update unit 112 inputs the speed of the shoot ball robot 200a to the speed of the virtual shoot ball 20b at step S1204 and performs physical simulation at step S1208 to update the virtual object information of each virtual object 20. When the processing starts not right after the shoot ball robot 200a starts moving (No at step S1200), the virtual object 20 performs physical simulation at step S1208 to update the virtual object information of each virtual object 20.

Then, when the shoot ball robot 200a and the virtual shoot ball 20b both have stopped for a certain time or longer (Yes at step S1212), the virtual object update unit 112 sets a position substantially identical to that of the shoot ball robot 200a to the position of the virtual shoot ball 20b at step S1216 to match the virtual shoot ball 20b and the shoot ball robot 200a, and accordingly, the series of pieces of processing ends. When the shoot ball robot 200a and the virtual shoot ball 20b both have not stopped for the certain time (in other words, when at least one of them has moved) (No at step S1212), the virtual object 20 continues physical simulation at step S1208.

The control target update unit 113 performs the update processing (step S1008 in FIG. 8) of the control target of the shoot ball robot 200a. More specifically, the control target update unit 113 updates the control target of the shoot ball robot 200a so that the shoot ball robot 200a follows the virtual shoot ball 20b.

The control information generation unit 114 performs the generation processing (step S1012 in FIG. 8) of control information for controlling the shoot ball robot 200a. More specifically, the control information generation unit 114 generates the control information by using the control target of the shoot ball robot 200a updated by the control target update unit 113. The control information generation unit 114 may generate the control information by using an API provided in various languages such as C++, JavaScript (registered trademark), and Python. For example, the control information generation unit 114 may generate the control information by using a command "roll(speed, direction)" ("speed" is a unitless scalar of 0 to 150, and "direction" is an angle of 0 to 360) in JavaScript (registered trademark). To move the shoot ball robot 200a to a desired position through the command, the control information generation unit 114 may use P (proportional) control that feeds back an output in accordance with the difference between a target position and a position before movement. In this case, the control information generation unit 114 may define the values of "speed" and "direction" input to the command as in Expressions (1) and (2) below. In the expressions, $X_{dist}$ represents a target two-dimensional position vector, $X_{cur}$ represents a two-dimensional position vector before movement, and α represents a predetermined coefficient.

$$\text{speed} = \alpha \cdot \|X_{dist} - C_{cur}\| \quad (1)$$

$$\text{direction} = \arctan(X_{dist} - X_{cur}) \quad (2)$$

The shoot ball robot 200a can perform various behaviors such as movement by using control information generated by the control information generation unit 114. FIG. 15 illustrates exemplary information related to control of the shoot ball robot 200a. The information related to control of the shoot ball robot 200*a* is not limited to the content of FIG. 15. The method of controlling the shoot ball robot 200*a* is not limited to that described above. For example, the information processing device 100 may control the behavior of the shoot ball robot 200*a* by tilting the billiard table by using the control information. Alternatively, magnets may be included in the billiard table and the shoot ball robot 200*a*, and the information processing device 100 may move the magnet included in the billiard table by using the control information, thereby controlling the behavior of the shoot ball robot 200*a* by using magnetic force of the magnets.

The video information generation unit 115 performs the generation processing (step S1016 in FIG. 8) of video information to be projected onto the projection surface 10. For example, the video information generation unit 115 generates the video information when the billiard table is viewed from above by using information related to the size, texture, position, and the like of the shoot ball robot 200*a*. In addition, the video information generation unit 115 may generate the video information that generates visual effects associated with motion of the shoot ball robot 200*a* and the virtual object 20 (such as the virtual target ball 20*a* or the virtual shoot ball 20*b*).

The following describes a specific example of the video information generated by the video information generation unit 115 with reference to FIGS. 16A 16B, 16C, and 16D. First, as illustrated in FIG. 16A, a plurality of virtual target balls 20*a* are projected onto the billiard table and the shoot ball robot 200*a* is placed on the billiard table (in the example, the virtual shoot ball 20*b* is not projected).

Thereafter, when the shoot ball robot 200*a* is cued by the user as illustrated in FIG. 16B, the shoot ball robot 200*a* and the plurality of virtual target balls 20*a* collide with one another as illustrated in FIG. 16C. In this case, the video information generation unit 115 may express influence of the collision by generating video information related to ripples 20*c*. In FIG. 16D, after the collision, some of the plurality of virtual target balls 20*a* fall into pockets as virtual objects 20, and the shoot ball robot 200*a* bounces. If the shoot ball robot 200*a* has moved to a position where the shoot ball robot 200*a* falls into a pocket, the video information generation unit 115 may generate video information with which red texture is projected onto the entire shoot ball robot 200*a* (or video information with which the entire video flashes in red). Accordingly, the user can recognize that the shoot ball robot 200*a* has fallen into the pocket.

After being cued by the user, the shoot ball robot 200*a* behaves to follow the virtual shoot ball 20*b* as described above, but the shoot ball robot 200*a* largely delays behind the virtual shoot ball 20*b* due to the performance of the shoot ball robot 200*a* and the like in some cases (in other words, the behavior of the real object 200 delays behind the behavior of the second virtual object by a predetermined time or longer in some cases).

In this case, the virtual object update unit 112 may stop or slow down the virtual shoot ball 20*b* until the shoot ball robot 200*a* catches up with the virtual shoot ball 20*b* (in other words, the virtual object update unit 112 may stop or slow down the behavior of the second virtual object based on the behavior of the real object 200). For example, when the shoot ball robot 200*a* delays behind the virtual shoot ball 20*b* by a predetermined time (T seconds) or longer as illustrated in FIG. 17A, the virtual object update unit 112 may slow down the virtual shoot ball 20*b* as illustrated in FIG. 17B. As illustrated in FIG. 17C, the virtual object update unit 112 may reduce discomfort of the user due to the delay by generating a virtual object having a shape connecting a region near the shoot ball robot 200*a* (for example, a region surrounding a grounded point of the shoot ball robot 200*a*) and the virtual shoot ball 20*b* in a streamline formation. In addition, the control target update unit 113 may differentiate the behavior timing of the shoot ball robot 200*a* from the behavior timings of the virtual target ball 20*a* and the virtual shoot ball 20*b*. For example, when the shoot ball robot 200*a* is cued by the user, the virtual target ball 20*a* and the virtual shoot ball 20*b* first collide with each other and move due to the behavior of the shoot ball robot 200*a* as illustrated in FIG. 17D (in the drawing, the virtual target ball 20*a* is not illustrated for simplification). In this case, the shoot ball robot 200*a* moves in accordance with the laws of physics upon the cue by the user, but its behavior control by the control target update unit 113 is not performed. Then, when the virtual target ball 20*a* and the virtual shoot ball 20*b* have stopped, the control target update unit 113 updates the control target of the shoot ball robot 200*a* to move the shoot ball robot 200*a* to the position of the virtual shoot ball 20*b* as illustrated in FIG. 17E. Accordingly, the control target update unit 113 can reduce discomfort of the user due to delay.

The control target update unit 113 may predict the behavior of the shoot ball robot 200*a* (real object 200) by using the virtual shoot ball 20*b* (second virtual object) and update the control target of the shoot ball robot 200*a* based on a result of the prediction. More specifically, when delay of the shoot ball robot 200*a* is determined, the control target update unit 113 may recognize the behavior of the virtual shoot ball 20*b* at a time ahead by the delay of the shoot ball robot 200*a* through physical simulation and update the control target based on the behavior. Accordingly, the control target update unit 113 can reduce control delay of the shoot ball robot 200*a* and reduce discomfort of the user. Since substantially no delay occurs to the virtual object 20 (such as the virtual target ball 20*a*), no behavior prediction as described above may be performed. For example, the method of measuring the time of control delay of the shoot ball robot 200*a* is not particularly limited. For example, the time of control delay of the shoot ball robot 200*a* may be measured through analysis of an input image or may be acquired from product information (specifications) of the shoot ball robot 200*a*.

As illustrated in FIGS. 18A, 18B, 18C, 18D, 18E, and 18F, the information processing device 100 may control the behavior of the real object 200 based on an environment (such as terrain, soil, or wind) represented by the virtual object 20. For example, the information processing device 100 may express a normal billiard table (FIG. 18A), an ice surface (FIG. 18B), or a sand surface (FIG. 18C) as the virtual object 20 and change the position or physical quantity (such as the speed or the friction coefficient) of the shoot ball robot 200*a* on these surfaces. For example, the information processing device 100 may move the shoot ball robot 200*a* on the ice surface (FIG. 18B) at a speed faster than that of the shoot ball robot 200*a* on the sand surface (FIG. 18C).

The information processing device 100 may express, as the virtual object 20, a table (FIG. 18D) including a recessed part or an environment (FIG. 18E) in which upwind blows, and may change the position or physical quantity (such as the speed or the friction coefficient) of the shoot ball robot 200*a* in these environments. For example, the information processing device 100 may cause the shoot ball robot 200*a* to perform motion of rolling down and then moving up on the recessed part or may change the speed of the shoot ball robot 200*a* in accordance with the strength of the upwind.

The information processing device 100 may control not only the behavior of the real object 200 but also the behavior of the virtual object 20 based on an environment (such as terrain, soil, or wind) represented by the virtual object 20. The information processing device 100 may change a parameter (such as mass) of the shoot ball robot 200*a* (FIG. 18F) instead of an environment in which the shoot ball robot 200*a* is placed.

Figure 19A:
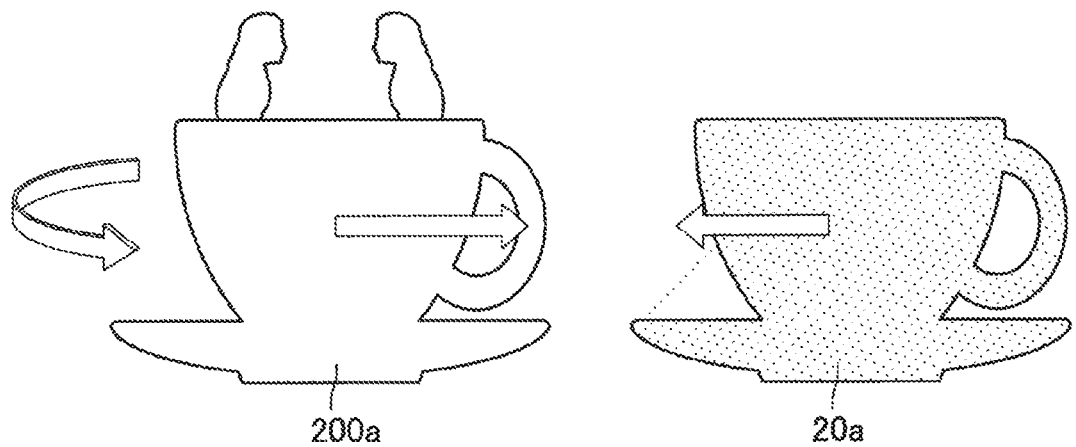
FIGS. 19A, 19B, and 19C are diagrams illustrating an example in which the embodiment of the present disclosure is applied to a coffee cup system.
Figure 19B:
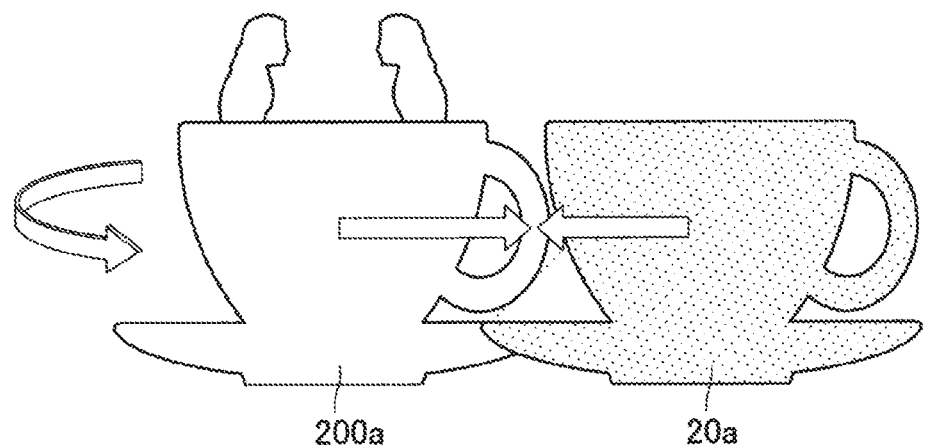
Figure 19C:
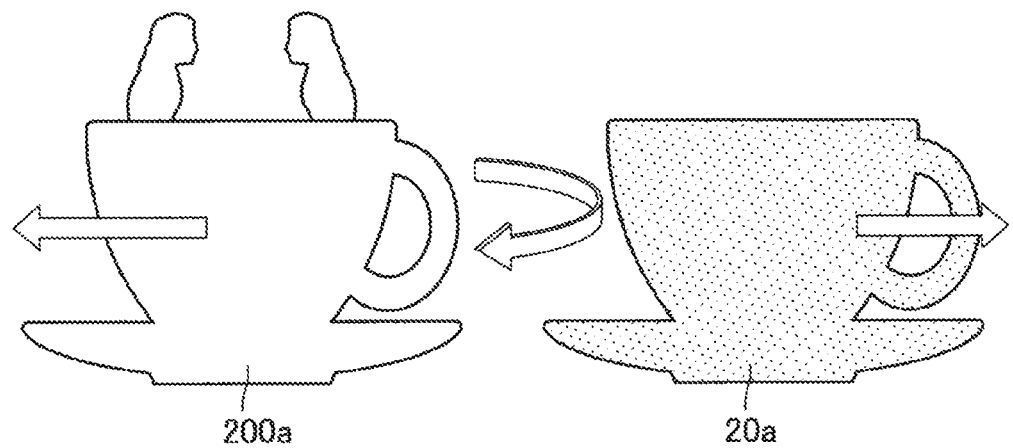

A coffee cup system illustrated in FIGS. 19A, 19B, and 19C are modifications in which force is fed back from the virtual object 20 to the real object 200 to change the position or the like of the real object 200, similarly to the above-described billiard system.

More specifically, as illustrated in FIG. 19A, a user on which the information processing device 100 (see-through head-mounted display) is mounted is on board a coffee cup robot 200*a* as the real object 200, and the user sees a virtual coffee cup 20*a* as the virtual object 20 through the information processing device 100. Then, when the coffee cup robot 200*a* collides with the virtual coffee cup 20*a* as illustrated in FIG. 19B, a collision phenomenon is fed back to the coffee cup robot 200*a* that the user is on board, and the behavior of the coffee cup robot 200*a* is changed in accordance with the impact of the collision as illustrated in FIG. 19C (the coffee cup robot 200*a* and the virtual coffee cup 20*a* are bounced off from each other due to the collision in FIG. 19C). The embodiment of the present disclosure is also applicable to a system other than the coffee cup system.

(2.2. Bouldering system)

The following describes an example in which the embodiment of the present disclosure is applied to a bouldering system. FIGS. 20A and 20B are schematic diagrams of the bouldering system. As illustrated in FIG. 20A, rock robots 200*a* as a plurality of real objects 200 and virtual rocks 20*a* as a plurality of virtual objects 20 are disposed on a wall surface (the projection surface 10) vertically disposed. Each rock robot 200*a* is a device movable on the wall surface and disposed at a position overlapping a virtual rock 20*a* near the user.

In the present example, the behavior of each rock robot 200*a* is controlled based on the physical relation between the rock robot 200*a* and the corresponding virtual rock 20*a*. More specifically, each virtual rock 20*a* is provided with a unique ID. The rock robots 200*a* are allocated with the IDs of the virtual rocks 20*a* different from each other and follow the virtual rocks 20*a* having the respective IDs. The information processing device 100 recognizes the position of the user by analyzing an input image. Then, when the user moves on the plurality of rock robots 200*a* and becomes separated from the center of the wall surface by a predetermined distance or longer as illustrated in FIG. 20B, all virtual rocks 20*a* move in a direction opposite to the user while keeping the relative positional relation therebetween as illustrated in FIG. 20C. The rock robots 200*a* move following the movement of the virtual rocks 20*a*, and thus the position of the user returns to the vicinity of the center of the wall surface. The information processing device 100 preferentially allocates the IDs of virtual rocks 20*a* closer to the user to the rock robots 200*a*. Accordingly, as illustrated in FIG. 20D, when separated from the user by the predetermined distance or longer, each rock robot 200*a* is allocated with the ID of a virtual rock 20*a* closer to the user and moves to the position of the virtual rock 20*a*. Accordingly, the user can continue bouldering semipermanently in effect by using the wall surface having a limited area.

The following describes the principle of operation of each rock robot 200*a* in the present example with reference to FIGS. 21A and 21B. A magnet 200*a*-1 is built in inside the rock robot 200*a*, and an all-direction movement truck 201 in which an electromagnet 201-1 is built in is disposed at a position corresponding to the rock robot 200*a* on the back of the wall surface (projection surface 10). The rock robot 200*a* sticks to the position of the corresponding all-direction movement truck 201 through the built-in magnet 200*a*-1.

As the all-direction movement truck 201 reduces the power of the electromagnet 201-1 and moves on the wall surface by moving a wheel 201-2, the rock robot 200*a* corresponding to the all-direction movement truck 201 moves on the wall surface. When the rock robot 200*a* has reached a target position, the all-direction movement truck 201 increases the power of the electromagnet 201-1 to fix the rock robot 200*a*.

Each rock robot 200*a* has a wireless LAN communication function (assumed to be achieved by the control communication unit 230 in FIG. 7). The information processing device 100 can perform communication of control information in the JavaScript Object Notation (JSON) format with the rock robot 200*a* by providing an internet protocol (IP) address unique to the rock robot 200*a*. In addition, the rock robot 200*a* can recognize its position and posture by reading a marker pattern provided on the back of the wall surface through a camera included in the corresponding all-direction movement truck 201. Thus, when having received the JSON-format control information including target position coordinates such as {"x" from the information processing device 100:"100", "y":"200"}, the rock robots 200*a* can move to the position coordinates.

The following describes processing performed by each functional component of the information processing device 100. First, the real object recognition unit 111 of the information processing device 100 performs the above-described real object recognition processing (step S1000 in FIG. 8). For example, the real object recognition unit 111 recognizes the position and posture of the rock robots 200*a* in real time as illustrated in FIG. 22. More specifically, each rock robot 200*a* recognizes its position and posture by using the marker pattern and then and provides these pieces of information to the real object recognition unit 111 through wireless LAN communication. In the present example, the real object recognition unit 111 also recognizes bone information and the central position of the user by performing predetermined image processing (such as estimation processing based on deep learning) on an input image. The bone information is information related to the state of bones and joints of the user and used for the user posture recognition processing. The central position of the user is, for example, average values of the position coordinates of the joints. Information recognized by the real object recognition unit 111 is not limited to the content of FIG. 22.

The virtual object update unit 112 performs the virtual object information update processing (step S1004 in FIG. 8). In the present example, only some virtual rocks 20*a* are projected onto the wall surface, and a vast bouldering wall is generated in the system. The origin of each virtual coordinate axis corresponds to the center coordinates of the wall surface. When the user at the position of a rock robot 200*a* moves on another rock robot 200*a* and the center coordinates of the user becomes separated from the origin by a predetermined distance or longer, the virtual object update unit 112 moves all virtual rocks 20*a*, while keeping the relative positional relation thereof, so that the center coordinates of the user returns to the origin. FIG. 23 illustrates exemplary virtual object information updated by the virtual object update unit 112. The virtual object information updated by the virtual object update unit 112 is not limited to the content of FIG. 23.

The virtual object update unit 112 may move the virtual rocks 20a when it is determined that all hand and foot coordinates (in other words, bone end points) of the user are in contact with the coordinates of virtual rocks 20a (in other words, the user is holding rock robots 200a) and the position of each virtual rock 20a is not separated from the position of the corresponding rock robot 200a by the predetermined distance nor longer. Accordingly, the virtual object update unit 112 can prevent movement of the virtual rocks 20a and the rock robots 200a while the user is moving and large separation of each virtual rock 20a and the corresponding rock robot 200a.

Figure 24:
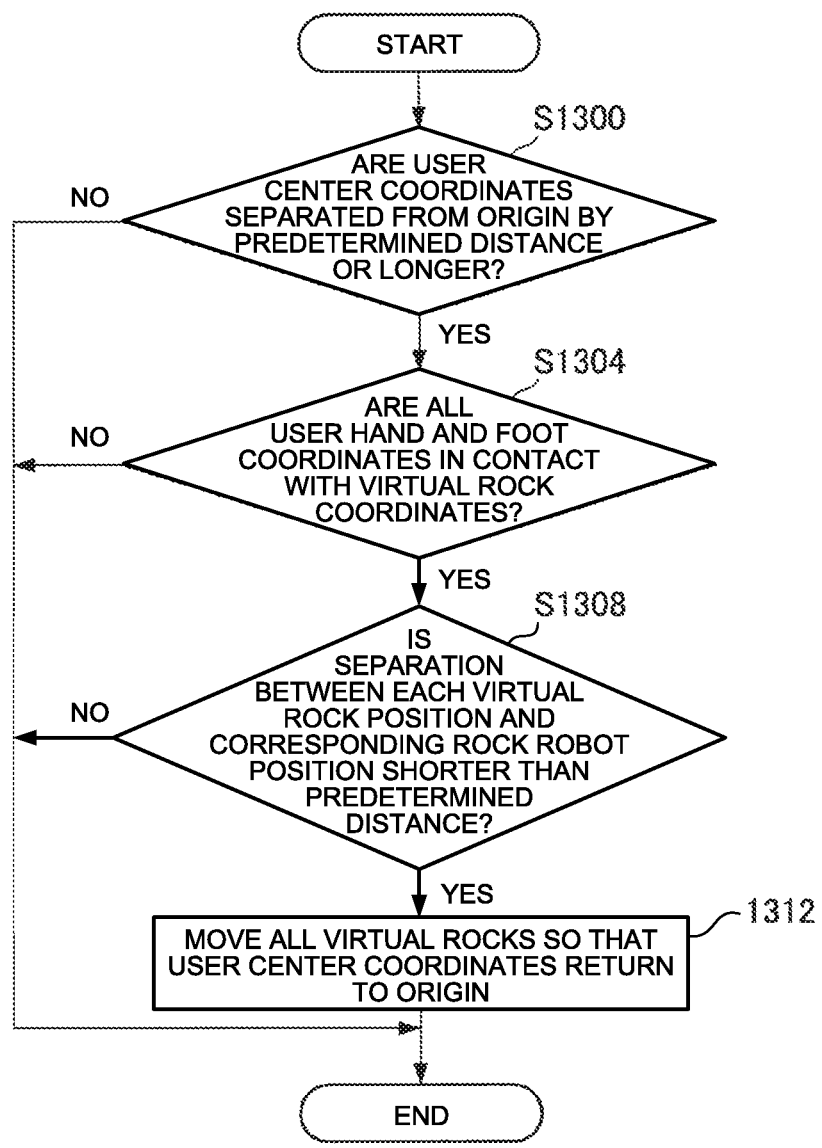
FIG. 24 is a flowchart illustrating an exemplary process of update processing of the virtual object information in the bouldering system.

The following describes a specific example of the virtual object information update processing performed by the virtual object update unit 112 with reference to FIG. 24. At step S1300, the virtual object update unit 112 determines whether the center coordinates of the user are separated from the origin (the center coordinates of the wall surface) by the predetermined distance or longer. When the center coordinates of the user are separated from the origin by the predetermined distance or longer (Yes at step S1300), the virtual object update unit 112 determines whether all hand and foot coordinates of the user are in contact with the coordinates of virtual rocks 20a at step S1304.

When all hand and foot coordinates of the user are in contact with the coordinates of virtual rocks 20a (Yes at step S1304), the virtual object update unit 112 determines whether separation between the position of each virtual rock 20a and the position of the corresponding rock robot 200a is shorter than the predetermined distance at step S1308. When separation between the position of each virtual rock 20a and the position of the corresponding rock robot 200a is shorter than the predetermined distance (Yes at step S1308), the virtual object update unit 112 moves all virtual rocks 20a, while keeping the relative positional relation therebetween, so that the center coordinates of the user return to the origin at step S1312, and accordingly, the series of pieces of processing ends.

When the center coordinates of the user is not separated from the origin by the predetermined distance nor longer at step S1300 (No at step S1300), when not all hand and foot coordinates of the user are not in contact with the coordinates of virtual rocks 20a (No at step S1304) at step S1304, or when separation between the position of each virtual rock 20a and the position of the corresponding rock robot 200a is not shorter than the predetermined distance or longer at step S1308 (No at step S1308), the virtual object update unit 112 does not move the virtual rocks 20a, and the series of pieces of processing ends.

The control target update unit 113 performs the control target update processing (step S1008 in FIG. 8) of each rock robot 200a. More specifically, the control target update unit 113 updates the control target of the rock robot 200a by allocating the ID of a virtual rock 20a to the rock robot 200a.

The following describes a specific example of the control target update processing of each rock robot 200a performed by the control target update unit 113 with reference to FIG. 25. The control target update unit 113 updates the control target of each rock robot 200a by repeating the processing at steps S1400 to S1412 illustrated in FIG. 25 for the rock robot 200a.

More specifically, at step S1400, the control target update unit 113 determines whether the rock robot 200a is separated from the center coordinates of the user and the center coordinates of the wall surface by the predetermined distance or longer. When the rock robot 200a is separated from the center coordinates of the user and the center coordinates of the wall surface by the predetermined distance or longer (Yes at step S1400), the control target update unit 113 determines whether any of the virtual rocks 20a to which no rock robots 200a correspond is closer to the center coordinates of the wall surface than the rock robot 200a at step S1404.

When any of the virtual rocks 20a to which no rock robots 200a correspond is closer to the center coordinates of the wall surface than the rock robot 200a (Yes at step S1404), the control target update unit 113 sets, as a new corresponding virtual rock 20a, a virtual rock 20a closest to the center coordinates of the wall surface among the virtual rocks 20a to which no rock robots 200a correspond at step S1408.

When the rock robot 200a is not separated from the center coordinates of the user and the center coordinates of the wall surface by the predetermined distance nor longer at step S1400 (No at step S1400) or when none of the virtual rocks 20a to which no rock robots 200a correspond is closer to the center coordinates of the wall surface than the rock robot 200a at step S1404 (No at step S1404), the control target update unit 113 performs processing at step S1412. More specifically, the control target update unit 113 generates a path (route) through which the rock robot 200a can move to the position of the corresponding virtual rock 20a without colliding with any other rock robot 200a. Then, the control target update unit 113 sets the control target to be waypoints obtained by dividing the path by a predetermined distance.

The control information generation unit 114 performs the generation processing (step S1012 in FIG. 8) of control information for controlling the rock robot 200a. More specifically, the control information generation unit 114 generates the control information by using the control target of the rock robot 200a updated by the control target update unit 113. FIG. 26 illustrates exemplary information related to control of the rock robot 200a. Information related to control of the rock robot 200a is not limited to the content of FIG. 26.

The video information generation unit 115 performs the generation processing (step S1016 in FIG. 8) of video information to be projected onto the wall surface (projection surface 10). For example, the video information generation unit 115 generates the video information by using information related to the size, texture, position, and the like of the rock robot 200a. In addition, the video information generation unit 115 may generate the video information for generating visual effects associated with motion of the rock robot 200a and the virtual rock 20a.

In the present example as well, when the rock robot 200a largely delays behind the corresponding virtual rock 20a while following the virtual rock 20a, the virtual object update unit 112 may stop or slow down the virtual rock 20a until the rock robot 200a catches up with the virtual rock 20a. The virtual object update unit 112 may generate a visual effect for reducing discomfort of the user due to the delay (for example, display of a virtual object having a shape connecting a region near the rock robot 200a and the virtual rock 20a in a streamline formation). The control target update unit 113 may differentiate the behavior timing of the rock robot 200a from the behavior timing of the virtual rock 20a. In the present example as well, the control target update unit 113 may predict a position to which the rock robot 200a is to be moved and may update the control target. In the present example as well, the information processing device 100 may control the behavior of the rock robot 200a based on an environment (such as the shape or material of the wall surface, or wind) represented by the virtual object 20. The embodiment of the present disclosure is also applicable to a system other than the bouldering system.

(2.3. Cycling system)

The following describes an example in which the embodiment of the present disclosure is applied to a cycling system. FIGS. 27A, 27B, and 27C are schematic diagrams of the cycling system. A user on which the information processing device 100 (see-through head-mounted display) is mounted sees that a virtual irregularity 20a as a virtual object 20 is superimposed on a road in the real space. The information processing device 100 generates a vast cycling road map on which a plurality of the virtual irregularities 20a are disposed, and estimates the position of the information processing device 100 on a cycling road based on various kinds of sensor information in real time. Accordingly, the user on which the information processing device 100 is mounted can drive on the cycling road by riding on a bicycle robot 200a as a real object 200.

As illustrated in FIG. 27A, the bicycle robot 200a includes a suspension 200a-1 capable of dynamically controlling its length. The information processing device 100 can control the length of the suspension 200a-1 by transmitting control information to the bicycle robot 200a. For example, the information processing device 100 can specify the length of the suspension 200a-1 in the range of −100 to +100 (in this case, 0 represents a normal length).

In the present example, the behavior of the suspension 200a-1 (or the bicycle robot 200a) is controlled based on the physical relation between the virtual irregularity 20a and the suspension 200a-1 (or the bicycle robot 200a). In the present example, when the bicycle robot 200a runs on the position of the virtual irregularity 20a as illustrated in FIGS. 27B and 27C, the information processing device 100 controls the length of the suspension 200a-1 in accordance with the shape of the virtual irregularity 20a and the like. Accordingly, the length of the suspension 200a-1 changes in accordance with the shape of the virtual irregularity 20a and the like, and thus the user can obtain a sense as if the user actually runs on an irregularity on the cycling road.

The following describes processing performed by each functional component of the information processing device 100. First, the real object recognition unit 111 of the information processing device 100 performs the above-described real object recognition processing (step S1000 in FIG. 8). For example, as illustrated in FIG. 28, the real object recognition unit 111 recognizes the position, posture, and speed of the head of the user (or the information processing device 100), the position (for example, the position of the front wheel), posture, and speed of the bicycle robot 200a, and the length of the suspension 200a-1 by simultaneous localization and mapping (SLAM) in real time. Information recognized by the real object recognition unit 111 is not limited to the content of FIG. 28. When the suspension 200a-1 has a wireless communication function (assumed to be achieved by the control communication unit 230 in FIG. 7), the information processing device 100 may receive information related to the length of the suspension 200a-1 from the suspension 200a-1.

The virtual object update unit 112 performs the virtual object information update processing (step S1004 in FIG. 8). More specifically, the virtual object update unit 112 updates the position of the virtual irregularity 20a in accordance with the position and posture of the information processing device 100. In addition, the virtual object update unit 112 displays the virtual irregularity 20a in the traveling direction based on a cycling road map in accordance with movement of the bicycle robot 200a (the virtual irregularity 20a may be displayed at random). The virtual object update unit 112 may perform, for example, processing of deleting the virtual irregularity 20a separated from the position of the bicycle robot 200a by a predetermined distance or longer. FIG. 29 illustrates exemplary virtual object information updated by the virtual object update unit 112. The virtual object information updated by the virtual object update unit 112 is not limited to the content of FIG. 29.

The control target update unit 113 performs the update processing (step S1008 in FIG. 8) of the control target of the rock robot 200a. More specifically, the control target update unit 113 determines whether the front wheel of the bicycle robot 200a overlaps the virtual irregularity 20a. When the front wheel of the bicycle robot 200a does not overlap the virtual irregularity 20a, the control target update unit 113 sets the target value of the length of the suspension 200a-1 to be zero. When the front wheel of the bicycle robot 200a overlaps the virtual irregularity 20a, the control target update unit 113 sets the target value of the length of the suspension 200a-1 in accordance with the shape (or height) of the virtual irregularity 20a.

The control information generation unit 114 performs the generation processing (step S1012 in FIG. 8) of control information for controlling the suspension 200a-1. More specifically, the control information generation unit 114 generates the control information by using the control target (the length of the suspension 200a-1) updated by the control target update unit 113. FIG. 30 illustrates exemplary information related to control of the suspension 200a-1. Information related to control of the suspension 200a-1 is not limited to the content of FIG. 30.

Figure 31A:
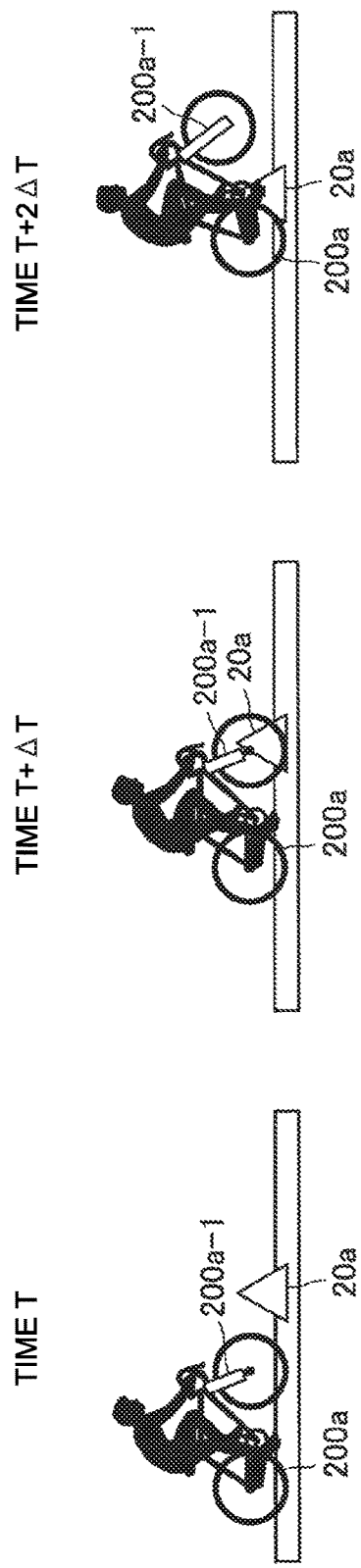
FIGS. 31A and 31B are diagrams illustrating an example in which control target update is performed through prediction of the behavior of a bicycle robot 200*a* in the cycling system.

The video information generation unit 115 performs the generation processing (step S1016 in FIG. 8) of video information to be projected onto a display of the information processing device 100. For example, the video information generation unit 115 generates the video information of the virtual irregularity 20a and the like. In addition, the video information generation unit 115 may generate the video information for generating visual effects associated with motion of the bicycle robot 200a In the present example, when the moving speed of the bicycle robot 200a is fast, in particular, control delay of the suspension 200a-1 is potentially larger, and the user potentially feels larger discomfort. More specifically, it is assumed that, as illustrated in FIG. 31A, the bicycle robot 200a is driving at time T, and the front wheel of the bicycle robot 200a overlaps the virtual irregularity 20a at time T+ΔT. However, the timing at which the length of the suspension 200a-1 is changed is time T+2ΔT, at which the front wheel of the bicycle robot 200a runs on the virtual irregularity 20a, because of control delay of the suspension 200a-1. In this case, the length of the suspension 200a-1 changes at a timing at which the virtual irregularity 20a is yet to be stepped, and thus the user feels discomfort.

Figure 31B:
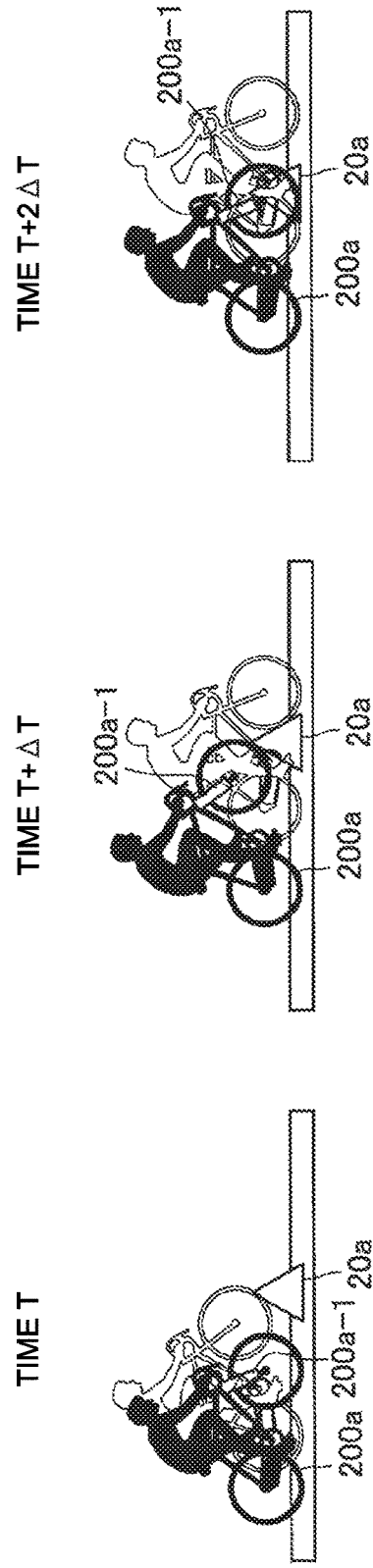

Thus, in the present example as well, the control target update unit 113 may predict the position of the bicycle robot 200a at a time preceding by the time of control delay of the suspension 200a-1 based on the current position and speed of the bicycle robot 200a, and update the control target based on a result of the prediction. More specifically, as illustrated in FIG. 31B, at time T, the control target update unit 113 predicts the position of the bicycle robot 200a at time T+ΔT preceding by ΔT as the time of control delay of the suspension 200a-1, and updates the control target based on the prediction result. Accordingly, the length of the suspension 200a-1 is changed at time T+ΔT, at which the front wheel of the bicycle robot 200a overlaps the virtual irregularity 20a, and thus the control target update unit 113 can reduce control delay of the suspension 200a-1 and reduce discomfort of the user. For example, a Kalman filter can be used to predict the position of the bicycle robot 200a, but the method of predicting the position of the bicycle robot 200a is not limited thereto.

In the present example as well, the virtual object 20 (a virtual bicycle 20b or a virtual suspension 20b-1) corresponding to the bicycle robot 200a (or the suspension 200a-1) may be used. When the bicycle robot 200a largely delays behind the corresponding virtual bicycle 20b while following the virtual bicycle 20b, the virtual object update unit 112 may stop or slow down the virtual bicycle 20b until the bicycle robot 200a catches up with the virtual bicycle 20b. The virtual object update unit 112 may generate a visual effect (for example, display of a virtual object having a shape connecting a region near the bicycle robot 200a and the virtual bicycle 20b in a streamline formation) for reducing discomfort of the user due to the delay. The control target update unit 113 may differentiate the behavior timing of the bicycle robot 200a from the behavior timing of the virtual bicycle 20b. In the present example as well, the information processing device 100 may control the behavior of the bicycle robot 200a (or the suspension 200a-1) based on an environment (such as terrain, soil, or wind) represented by the virtual object 20.

Figure 32:
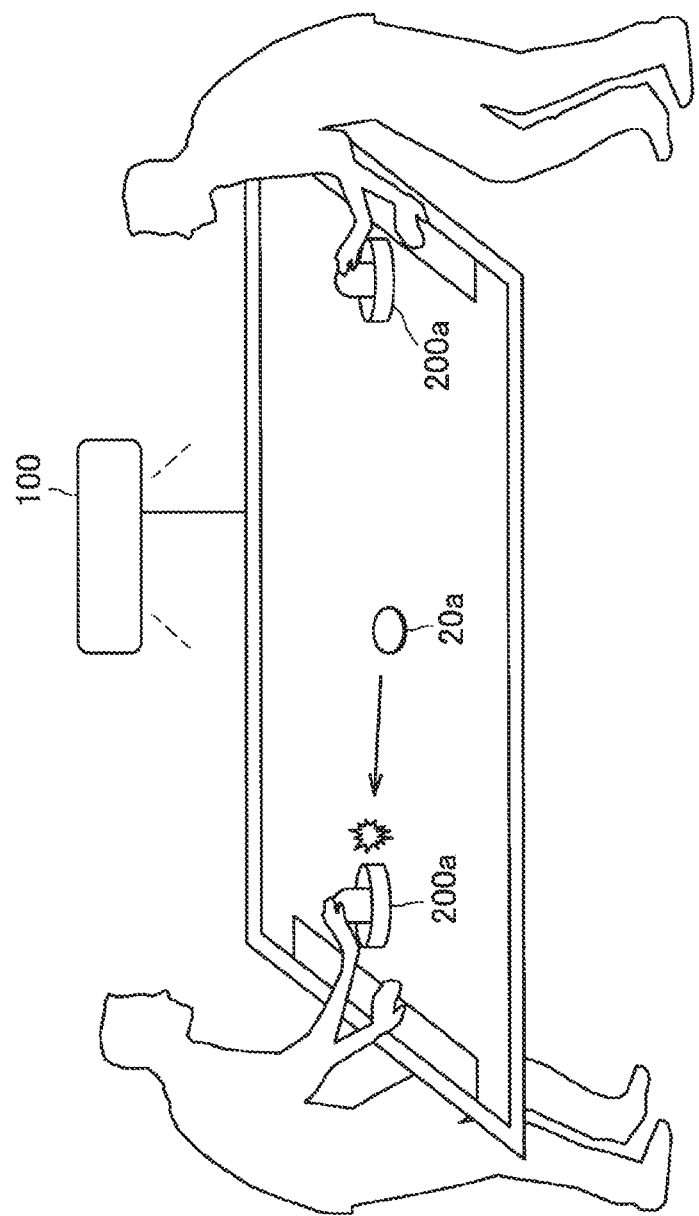
FIG. 32 is a diagram illustrating an example in which the embodiment of the present disclosure is applied to an air hockey system.

An air hockey system illustrated in FIG. 32 is a modification in which force is fed back from the virtual object 20 to the real object 200 to change motion or the like of the real object 200 like the above-described cycling system.

More specifically, as illustrated in FIG. 32, a plurality of users each grasp an instrument (mallet robot 200a) as the real object 200 and hit a virtual puck 20a as the virtual object 20. Wall surfaces of an air hockey table, goals, and the like are the virtual objects 20 as well. When the virtual puck 20a collides with the mallet robot 200a grasped by each user, a collision phenomenon is fed back to the mallet robot 200a, and the behavior of the mallet robot 200a is changed in accordance with the impact of the collision (the mallet robot 200a bounces). The embodiment of the present disclosure is also applicable to other than the air hockey system.

(2.4. Condiment handling system)

The following describes an example in which the embodiment of the present disclosure is applied to a condiment handling system. FIGS. 33A, 33B, and 33C are schematic diagrams of the condiment handling system. The information processing device 100 is installed above a table, and when a dish is placed on the table as illustrated in FIG. 33A, the information processing device 100 projects a virtual object 20 for decorating a meal onto the table in accordance with the content of the dish. In addition, a truck robot 200a on which various condiments as real objects 200 are placed is disposed on the table. As illustrated in FIG. 33B, when a user taps on the table with a finger, the information processing device 100 projects a virtual condiment 20a as a virtual object 20 expressing a condiment in accordance with the content of the dish.

In the present example, the behavior of the truck robot 200a is controlled based on the physical relation between the virtual condiment 20a and the truck robot 200a. More specifically, when the user selects the virtual condiment 20a by tapping on the table with a finger, the information processing device 100 controls movement of the truck robot 200a based on the physical positional relation between the virtual condiment 20a and the truck robot 200a to move the truck robot 200a to the position of the virtual condiment 20a (or a position tapped by a finger) as illustrated in FIG. 33C.

Figures 34A, 34B:
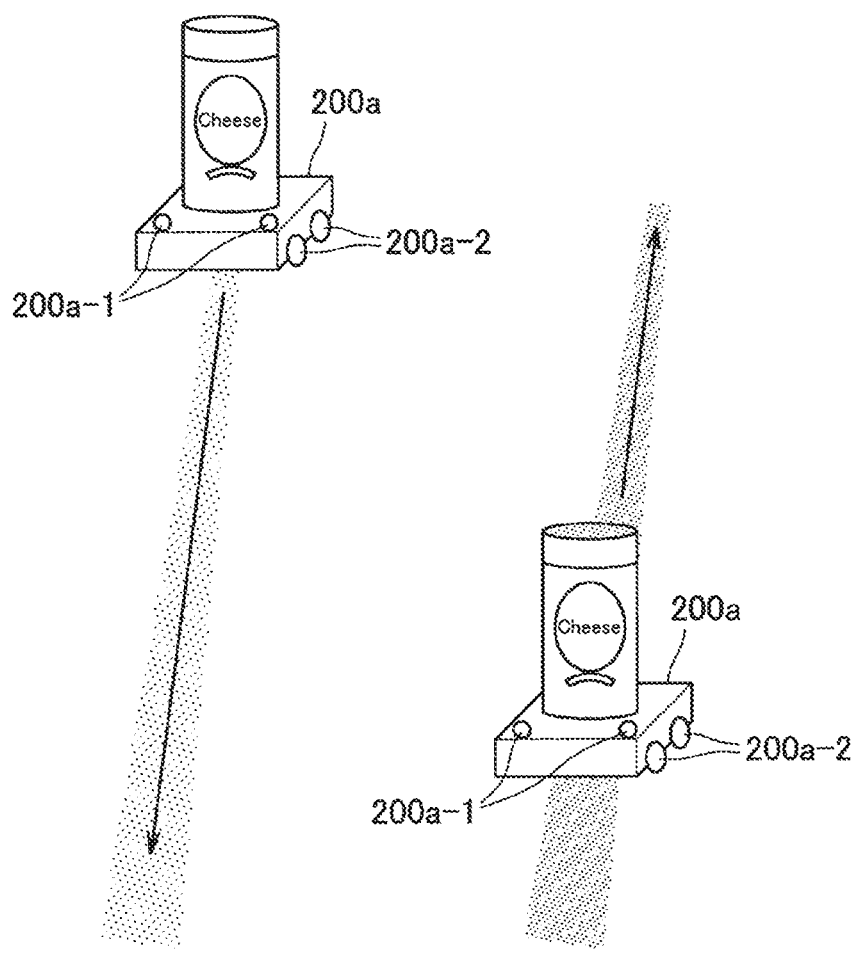
FIGS. 34A and 34B are diagrams illustrating the principle of operation of a truck robot 200*a* in the condiment handling system.

The following describes the principle of operation of the truck robot 200a in the present embodiment with reference to FIGS. 34A and 34B. As illustrated in the drawing, the truck robot 200a includes light sensors 200a-1 on the front right and left sides, respectively, and also includes motor drive wheels 200a-2. As illustrated in FIG. 34A, when predetermined light (for example, yellow light) is sensed by the light sensors 200a-1, positive voltage is applied to the wheels 200a-2 to travel forward the truck robot 200a. As illustrated in FIG. 34B, when other predetermined light (for example, blue light) is sensed by the light sensors 200a-1, negative voltage is applied to the wheels 200a-2 to travel backward the truck robot 200a. Accordingly, the information processing device 100 can easily control movement of the truck robot 200a only by projecting predetermined light onto a path (route) through which the truck robot 200a passes without performing wireless communication with the truck robot 200a. Although an emission unit configured to emit light used to control movement of the truck robot 200a is assumed to be achieved by the video output unit 140 included in the information processing device 100, but may be achieved by a device other than the video output unit 140.

Figure 35A:
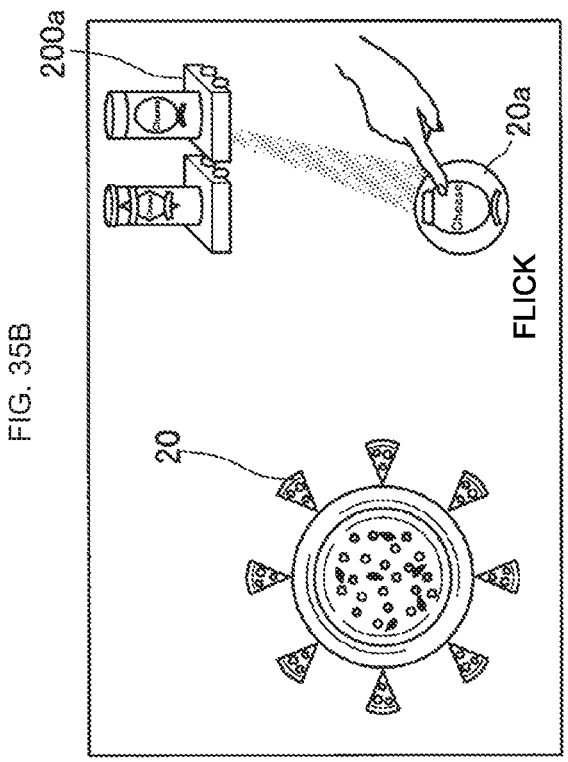
FIGS. 35A, 35B, 35C, and 35D are diagrams illustrating variations of movement control of the truck robot 200*a* in the condiment handling system.

The following describes variations of the movement control of the truck robot 200a with reference to FIGS. 35A, 35B, 35C, and 35D. FIG. 35A illustrates an example in which the information processing device 100 automatically selects condiments in accordance with the content of a dish placed on the table. More specifically, when the user only taps on the table with finger a without performing an operation to select the virtual condiment 20a, the information processing device 100 moves the truck robot 200a on which appropriate condiments are placed in accordance with the content of the dish to a position tapped by the finger.

Figure 35B:
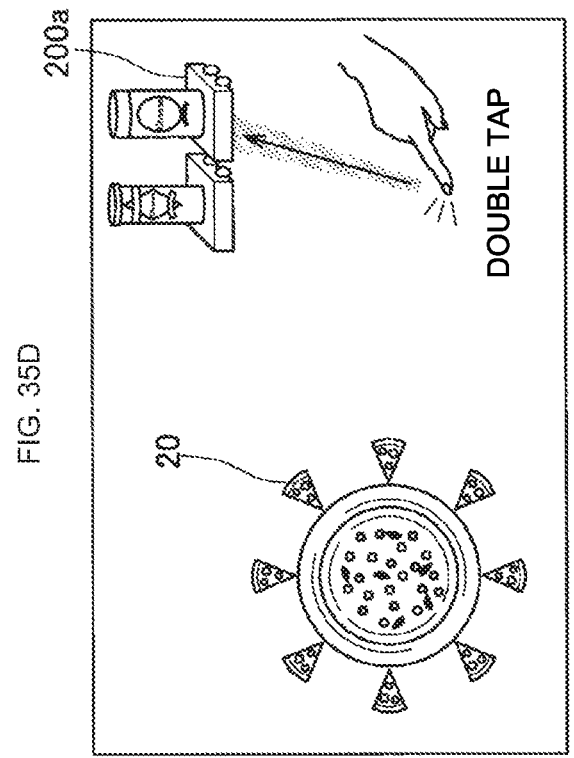
Figure 35C:
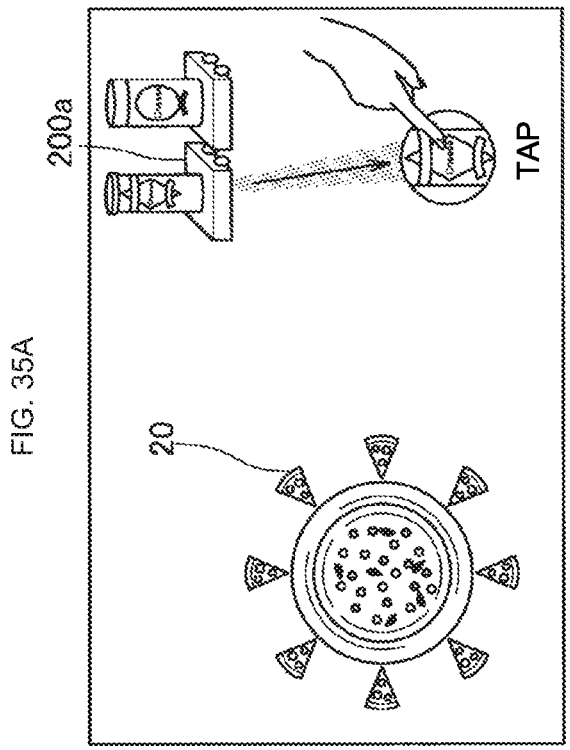
Figure 35D:
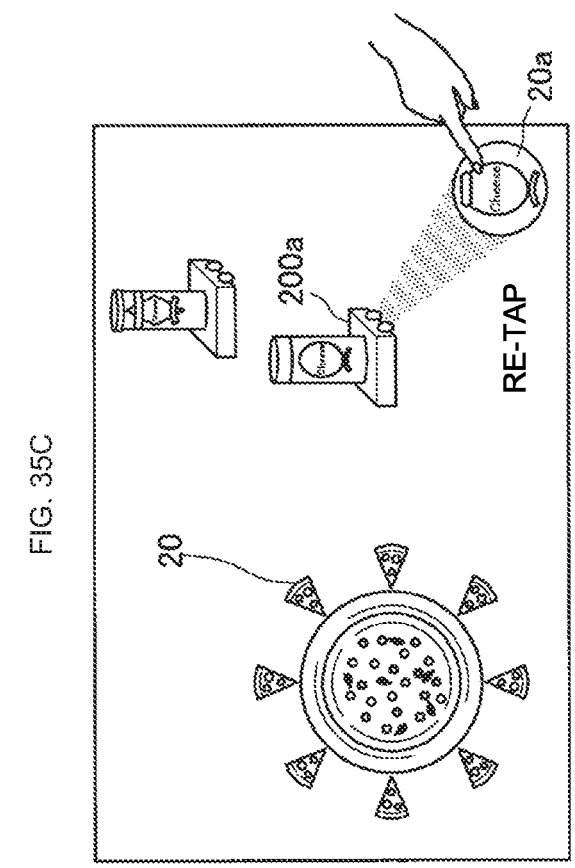

FIG. 35B illustrates an example in which, when the user flicks the virtual condiment 20a projected onto the table, a different virtual condiment 20a is projected in a selectable state. FIG. 35C illustrates an example in which, when the user taps on the table with a finger again while the truck robot 200a is moving, a target position to which the truck robot 200a is traveling is changed to a position tapped again. FIG. 35D illustrates an example in which, when the user double-taps the table with a finger, the truck robot 200a returns to the original position. The method of controlling movement of the truck robot 200a is not limited thereto. For example, movement of the truck robot 200a may be controlled when the user performs a gesture or the like other than tapping.

The following describes processing performed by each functional component of the information processing device 100. First, the real object recognition unit 111 of the information processing device 100 performs the above-described real object recognition processing (step S1000 in FIG. 8). For example, as illustrated in FIG. 36, the real object recognition unit 111 recognizes the kind and position of a dish and the kind, position, and posture of each condiment in real time by performing predetermined image processing (for example, estimation processing based on deep learning) on an input image. Information recognized by the real object recognition unit 111 is not limited to the content of FIG. 36.

The virtual object update unit 112 performs the virtual object information update processing (step S1004 in FIG. 8). More specifically, the virtual object update unit 112 updates virtual object information related to the virtual condiment 20a in accordance with a gesture such as tapping by the user and the recognized content of the dish. FIG. 37 illustrates exemplary virtual object information updated by the virtual object update unit 112. Virtual object information updated by the virtual object update unit 112 is not limited to the content of FIG. 37.

Figures 38, 39:
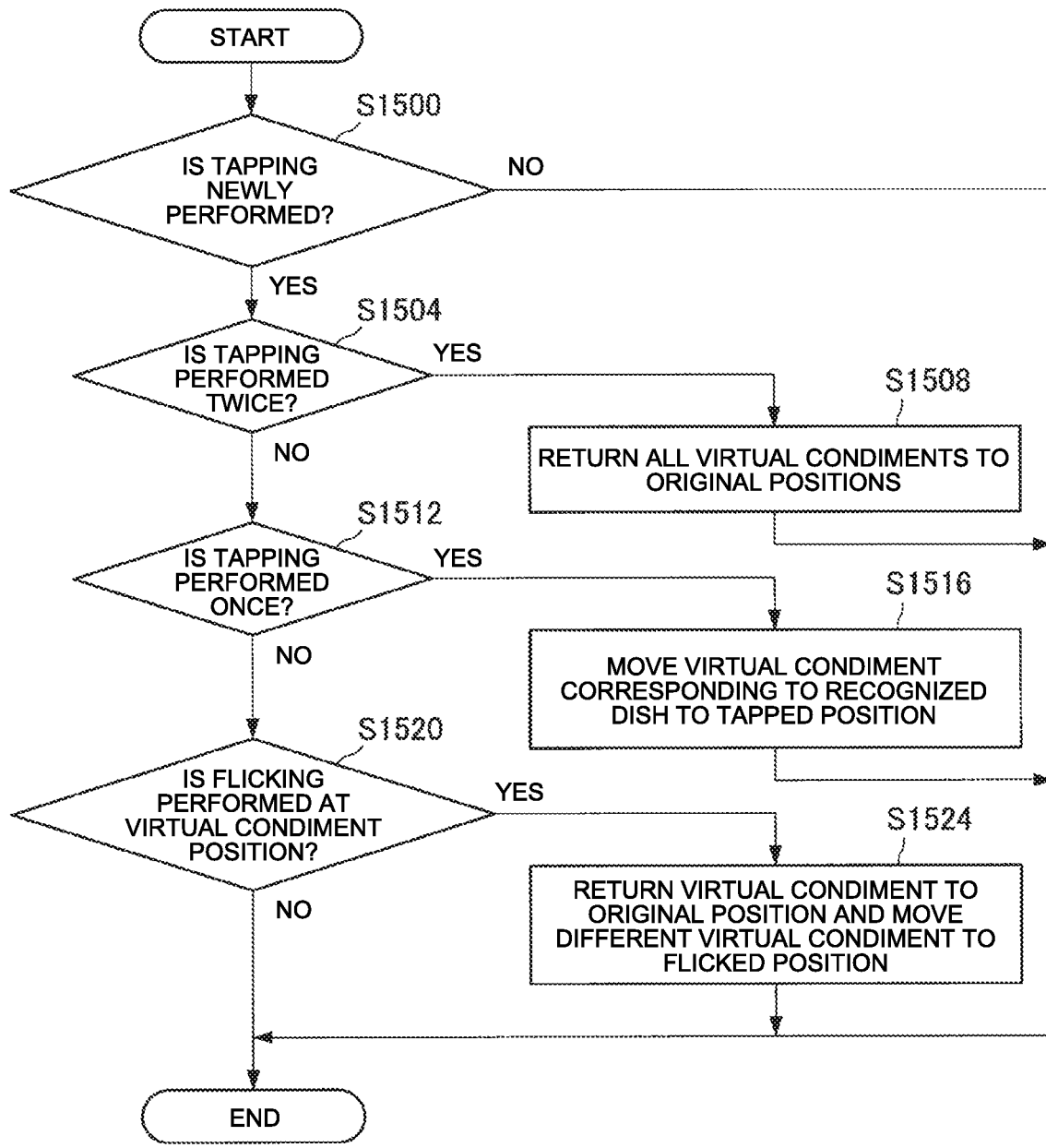
FIG. 38 is a flowchart illustrating an exemplary process of update processing of the virtual object information in the condiment handling system.
FIG. 39 is a diagram illustrating the content of definition by the control real object definition unit 119 in the condiment handling system.

The following describes a specific example of the virtual object information update processing performed by the virtual object update unit 112 with reference to FIG. 38. At step S1500, the virtual object update unit 112 determines whether tapping is newly performed by the user. When no tapping is newly performed by the user (No at step S1500), the processing ends. When tapping is newly performed by the user (Yes at step S1500), the virtual object update unit 112 determines whether the tapping is performed twice at step S1504. When the tapping is performed twice (Yes at step S1504), the virtual object update unit 112 returns all virtual condiments 20a to the original positions at step S1508. Accordingly, the truck robots 200a corresponding to the virtual condiments 20a return to the original positions.

When the tapping is not performed twice at step S1504 (No at step S1504), the virtual object update unit 112 determines whether the tapping is performed once at step S1512. When the tapping is performed once (Yes at step S1512), the virtual object update unit 112 moves the virtual condiment 20a corresponding to a recognized dish to a position tapped by a finger at step S1516. Accordingly, the truck robot 200a corresponding to the virtual condiment 20a moves to the position tapped by the finger.

When the tapping is not performed once at step S1512 (No at step S1512), the virtual object update unit 112 determines whether the user performs flicking at the position of the virtual condiment 20a at step S1520. When the user performs flicking at the position of the virtual condiment 20a (Yes at step S1520), the virtual object update unit 112 returns the projected virtual condiment 20a to the original position and moves a different virtual condiment 20a to the flicked position at step S1524. Accordingly, the user can select the different virtual condiment 20a. When the user does not perform flicking at the position of the virtual condiment 20a at step S1520 (No at step S1520), the series of pieces of processing ends.

The control target update unit 113 performs the update processing (step S1008 in FIG. 8) of the control target of the truck robot 200a. More specifically, the control target update unit 113 sets the control target of the truck robot 200a to be the position of the virtual condiment 20a (or a position tapped by a finger).

The control information generation unit 114 performs the generation processing (step S1012 in FIG. 8) of control information for controlling the truck robot 200a. More specifically, the control information generation unit 114 generates control information for generating a straight line connecting the control target (for example, the position of the virtual condiment 20a) and the position of the truck robot 200a and projects predetermined light (for example, yellow light) onto the straight line. FIG. 39 illustrates exemplary information related to control of the truck robot 200a. Information related to control of the truck robot 200a is not limited to the content of FIG. 39.

The video information generation unit 115 performs the generation processing (step S1016 in FIG. 8) of video information to be projected onto the table (projection surface 10). For example, the video information generation unit 115 generates the video information by using generated predetermined light (for example, yellow light) used to control movement of the truck robot 200a and information related to the size, texture, position, and the like of a plate on which the dish is served or the truck robot 200a. In addition, the video information generation unit 115 may generate video information for generating visual effects associated with motion of the truck robot 200a and the virtual condiment 20a, thereby further decorating the meal.

In the present example as well, the virtual object 20 (virtual truck 20b) corresponding to the truck robot 200a may be used in processing. When the truck robot 200a largely delays behind the corresponding virtual truck 20b while following the virtual truck 20b, the virtual object update unit 112 may stop or slow down the virtual truck 20b until the truck robot 200a catches up with the virtual truck 20b. The virtual object update unit 112 may generate a visual effect (for example, display of a virtual object having a shape connecting a region near the truck robot 200a and the virtual truck 20b in a streamline formation) for reducing discomfort of the user due to the delay. The control target update unit 113 may differentiate the behavior timing of the truck robot 200a from the behavior timing of the virtual truck 20b. In the present example as well, the control target update unit 113 may predict a position to which the truck robot 200a is to be moved and may update the control target. In the present example as well, the information processing device 100 may control the behavior of the truck robot 200a based on an environment (such as the shape or material of a table surface) represented by the virtual object 20. The embodiment of the present disclosure is also applicable to a system other than the condiment handling system.

(2.5. Domino system)

The following describes an example in which the embodiment of the present disclosure is applied to a domino system. FIGS. 40A, 40B, 40C, 40D, and 40E are schematic diagrams of the domino system. The information processing device 100 is installed above a table and projects a virtual wooden board 20a-1 and a virtual iron board 20a-2 as virtual objects 20 onto the table when a domino robot 200a as a real object 200 is placed on the table as illustrated in FIG. 40A. The projected virtual objects 20 are not limited to the virtual wooden board 20a-1 and the virtual iron board 20a-2. For example, the projected virtual objects 20 may be a region 20a-1 in which texture indicating wood is projected and a region 20a-2 in which texture indicating iron is projected (or a furnace in which melted iron is accumulated).

In the present example, the behavior of the domino robot 200a is controlled based on the physical relation between the domino robot 200a and each of the virtual wooden board 20a-1 and the virtual iron board 20a-2. More specifically, the information processing device 100 generates a virtual domino 20b as the virtual object 20 corresponding to the domino robot 200a.

When the user places the domino robot 200a on the virtual wooden board 20a-1 (or over the virtual wooden board 20a-1) as illustrated in FIG. 40B, the information processing device 100 sets wood to the material of the virtual domino 20b. When the user places the domino robot 200a on the virtual iron board 20a-2 (or over the virtual iron board 20a-2) as illustrated in FIG. 40D, the information processing device 100 sets iron to the material of the virtual domino 20b. Then, as illustrated in FIGS. 40C and 40E, the information processing device 100 projects texture corresponding to the material of the virtual domino 20b onto the domino robot 200a corresponding to the virtual domino 20b, and changes the position of the barycenter of the domino robot 200a. More specifically, when the domino robot 200a is placed on the virtual wooden board 20a-1, the information processing device 100 causes the domino robot 200a to be more likely to be inclined by setting the position of the barycenter of the domino robot 200a to be higher than when the domino robot 200a is placed on the virtual iron board 20a-2. Accordingly, the information processing device 100 can provide, to the user, an impression as if the mass of the domino robot 200a is changed.

The following describes the principle of change of the barycenter of the domino robot 200a in the present example with reference to FIGS. 41A, 41B, and 41C. Electromagnets 200a-1 are vertically arranged inside the domino robot 200a, and a metal weight 200a-2 is arranged between the electromagnets 200a-1. The magnetic forces of the electromagnets 200a-1 can be controlled by control information including a predetermined command.

It is assumed that the command includes pow1 representing the magnetic force of the upper electromagnet 200a-1, and pow2 representing the magnetic force of the lower electromagnet 200a-1. The values of pow1 and pow2 may be each set to be, for example, a "float" value of 0 to 1. More specifically, when the control information indicates (pow1, pow2)=(1, 0), the magnetic force of the upper electromagnet 200a-1 is stronger, and accordingly, the weight 200a-2 is attracted upward so that the height of the barycenter is increased. When the control information indicates (pow1, pow2)=(0, 1), the magnetic force of the lower electromagnet 200a-1 is stronger, and accordingly, the weight 200a-2 is attracted downward so that the height of the barycenter is decreased. When the control information indicates (pow1, pow2)=(0.5, 0.5), the magnetic forces of the upper and lower electromagnets 200a-1 are equal to each other and accordingly, the weight 200a-2 is positioned near the center. The principle of change of the barycenter of the domino robot 200a is not limited to that described above. For example, the command included in the control information may include only one of pow1 representing the magnetic force of the upper electromagnet 200a-1 and pow2 representing the magnetic force of the lower electromagnet 200a-1.

Figure 42:
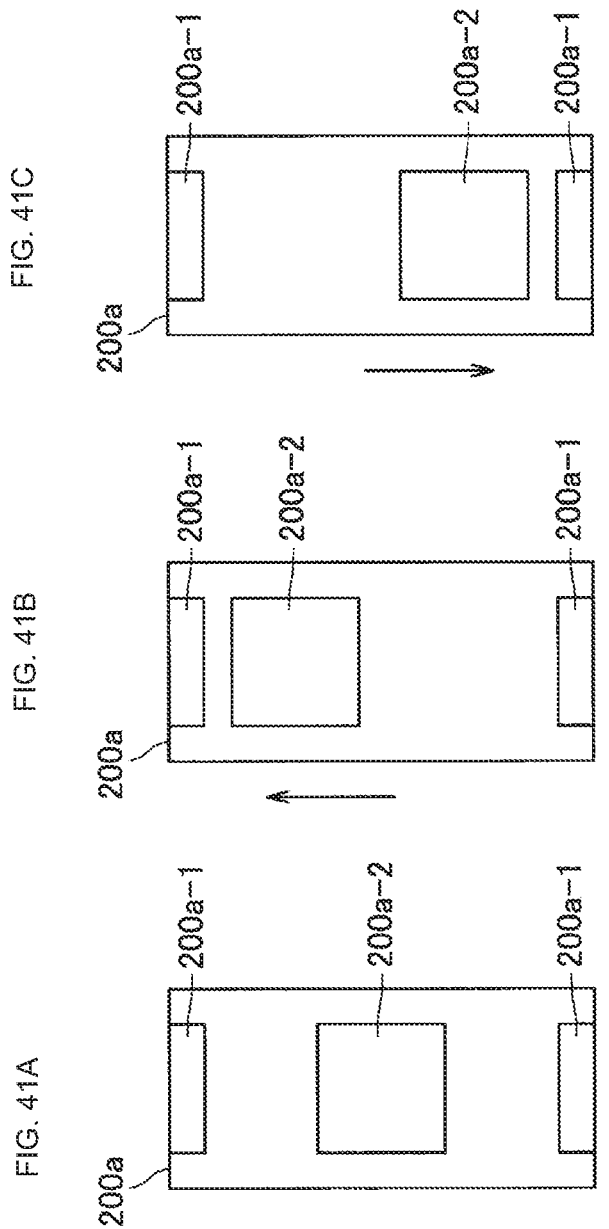
FIG. 42 is a diagram illustrating the content of definition by the recognition real object definition unit 116 in the domino system.

The following describes processing performed by each functional component of the information processing device 100. First, the real object recognition unit 111 of the information processing device 100 performs the above-described real object recognition processing (step S1000 in FIG. 8). For example, as illustrated in FIG. 42, the real object recognition unit 111 recognizes the position and posture of the domino robot 200a in real time by performing depth image processing. Information recognized by the real object recognition unit 111 is not limited to the content of FIG. 42.

The virtual object update unit 112 performs the virtual object information update processing (step S1004 in FIG. 8). More specifically, the virtual object update unit 112 generates the virtual domino 20b corresponding to the recognized domino robot 200a. Then, when the domino robot 200a is placed on the virtual wooden board 20a-1 or the virtual iron board 20a-2 by the user, the virtual object update unit 112 updates the material of the virtual domino 20b. FIG. 43 illustrates exemplary virtual object information updated by the virtual object update unit 112. Virtual object information updated by the virtual object update unit 112 is not limited to the content of FIG. 43.

The control target update unit 113 performs the update processing (step S1008 in FIG. 8) of the control target of the domino robot 200a. More specifically, the control target update unit 113 updates the target value of the mass of the domino robot 200a in accordance with the material of the virtual domino 20b (this is equivalent to update of the target value of the barycenter position of the domino robot 200a).

The control information generation unit 114 performs the generation processing (step S1012 in FIG. 8) of control information for controlling the domino robot 200a. More specifically, the control information generation unit 114 generates the control information by using the target value of the mass of the domino robot 200a updated by the control target update unit 113. FIG. 44 illustrates exemplary information related to control of the domino robot 200a. The information related to control of the domino robot 200a is not limited to the content of FIG. 44.

The video information generation unit 115 performs the generation processing (step S1016 in FIG. 8) of video information to be projected onto the table (projection surface 10). For example, the video information generation unit 115 generates the video information by using information related to the size, texture, position, and the like of the domino robot 200a. In addition, the video information generation unit 115 may generate the video information for generating a visual effect associated with motion of the domino robot 200a.

In the present example as well, when the domino robot 200a largely delays behind the corresponding virtual domino 20b while following the virtual domino 20b, the virtual object update unit 112 may stop or slow down the virtual domino 20b until the domino robot 200a catches up with the virtual domino 20b. The virtual object update unit 112 may generate a visual effect (for example, display of a virtual object having a shape connecting a region near the domino robot 200a and the virtual domino 20b in a streamline formation) for reducing discomfort of the user due to the delay. The control target update unit 113 may differentiate the behavior timing of the domino robot 200a from the behavior timing of the virtual domino 20b. In the present example as well, the control target update unit 113 may predict a position to which the domino robot 200a is to be moved (position at which the domino robot 200a inclines) and may update the control target. In the present example as well, the information processing device 100 may control the behavior of the domino robot 200a based on an environment (such as the shape or material of the table surface) represented by the virtual object 20. The embodiment of the present disclosure is also applicable to a system other than the domino system.

<3. Exemplary Hardware Configuration of Information Processing Device 100>

The above description is made on the various examples to which the embodiment of the present disclosure is applied. The following describes an exemplary hardware configuration of the information processing device 100 with reference to FIG. 45.

Figure 45:
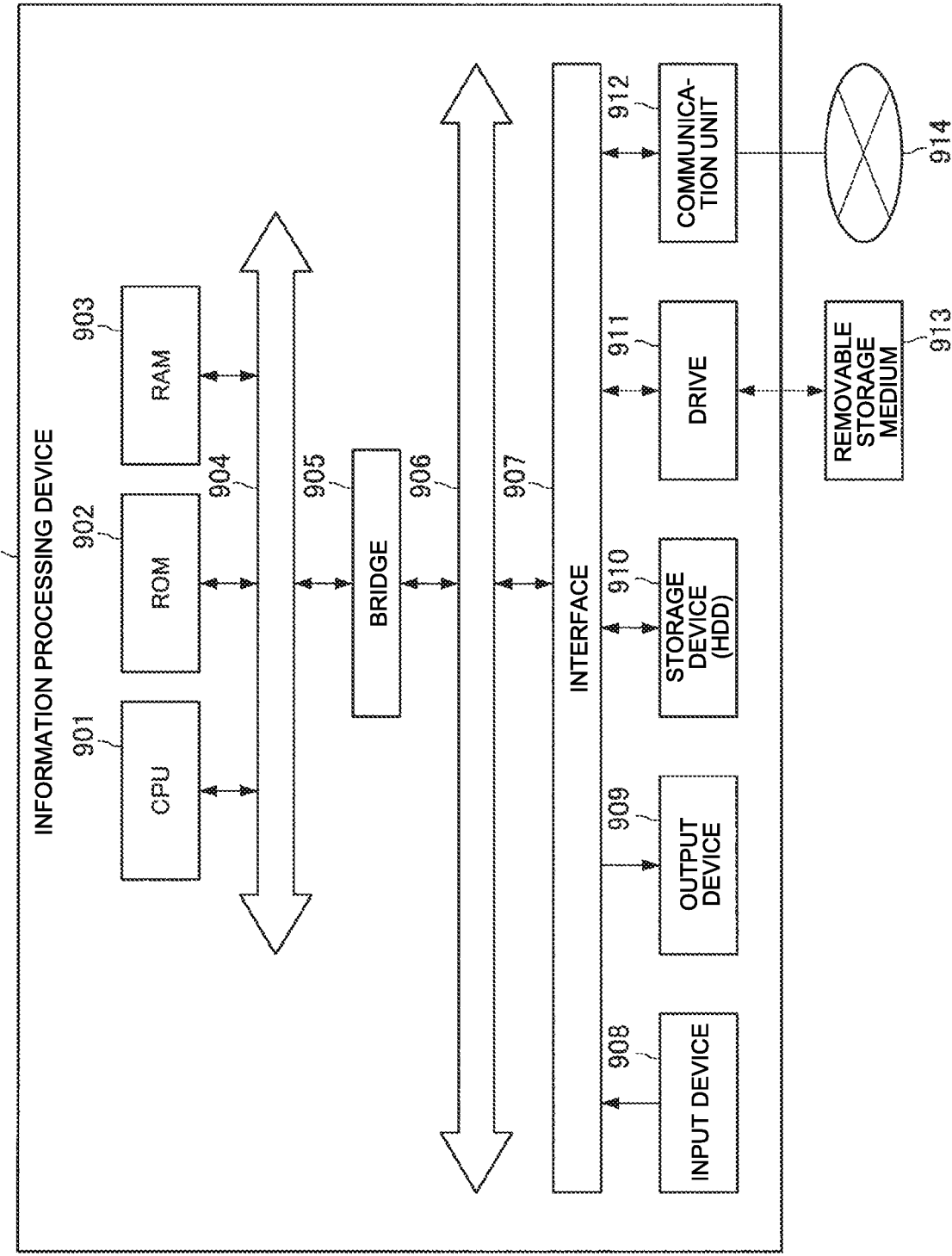
FIG. 45 is a block diagram illustrating an exemplary hardware configuration of the information processing device 100.

FIG. 45 is a diagram illustrating the exemplary hardware configuration of the information processing device 100. The information processing device 100 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device and controls the entire operation of the information processing device 100 in accordance with various computer programs. The CPU 901 may be a microprocessor. The ROM 902 stores computer programs, calculation parameters, and the like used by the CPU 901. The RAM 903 temporarily stores computer programs used in execution at the CPU 901, parameters that change from time to time in the execution, and the like. These components are connected with each other through the host bus 904 achieved by a CPU bus or the like. Each function of the control unit 110 of the information processing device 100 or the graphics display processing unit 130 is achieved through cooperation of the CPU 901, the ROM 902, and the RAM 903.

The host bus 904 is connected with the external bus 906 such as a peripheral component interconnect/interface (PCI) bus through the bridge 905. The host bus 904, the bridge 905, and the external bus 906 do not necessarily need to be separately configured, but functions of these components may be implemented on one bus.

The input device 908 includes an input unit through which the user inputs information, such as a mouse, a keyboard, a touch panel, a button, a microphone, a switch, a lever, and various sensors, and also includes an input control circuit configured to generate an input signal based on an input by the user and output the input signal to the CPU 901. The user of the information processing device 100 can input various kinds of information to each device and instruct processing operation by operating the input device 908. The function of the input unit 120 is achieved by the input device 908.

The output device 909 includes a display device such as a cathode ray tube (CRT) display device, a liquid crystal display (LCD) device, an organic light emitting diode (OLED) device, or a lamp. The output device 909 also includes a sound output device such as a speaker or a headphone. In addition, the output device 909 includes a drive device such as an actuator or a motor. The display device displays, by text or image, various kinds of information such as regenerated video data. The sound output device converts regenerated sound data or the like into sound and outputs the sound. The drive device performs force application based on control information. The function of the video output unit 140 or the operation output unit 160 is achieved by the output device 909.

The storage device 910 is a data storage device. The storage device 910 may include, for example, a storage medium, a record device configured to record data in the storage medium, a readout device configured to read data from the storage medium, and a deletion device configured to delete data recorded in the storage medium. The storage device 910 is achieved by, for example, a hard disk drive (HDD). The storage device 910 drives a hard disk and stores computer programs to be executed by the CPU 901 and various kinds of data.

The drive 911 is a storage medium reader writer and built in or externally connected with the information processing device 100. The drive 911 reads information recorded in a removable storage medium 913 mounted thereon, such as a magnetic disk, an optical disk, a magneto optical disc, or a semiconductor memory, and outputs the information to the RAM 903. The drive 911 can also write information to the removable storage medium 913.

The communication device 912 is, for example, a communication interface achieved by a communication device or the like for connecting to a communication network 914. The function of the control communication unit 150 is achieved by the communication device 912.

<4. Conclusion>

As described above, the information processing device 100 according to the present disclosure can recognize the physical relation between a virtual object 20 and a real object 200 positioned on an identical surface and control the behavior of the real object 200 based on the physical relation. The information processing device 100 controls the behavior of the real object 200 by controlling the position or a physical quantity of the real object 200. For example, the information processing device 100 controls the behavior of the real object 200 by controlling speed, mass, or the like as a physical quantity of the real object 200. Accordingly, the information processing device 100 can perform more appropriate physical feedback to a user.

Preferable embodiments of the present disclosure are described above in detail with reference to the accompanying drawings, but the technical scope of the present disclosure is not limited to such examples. Various changes and modifications could be thought of by a person having typical knowledge in the technical field of the present disclosure within the range of the technical idea written in the claims, and it should be understood that these changes and modifications belong to the technical scope of the present disclosure.

For example, the steps of each above-described flowchart do not necessarily need to be processed in a temporally sequential manner in the written order. Specifically, the steps of each flowchart may be processed in an order different from the written order or may be processed in parallel.

Effects stated in the present specification are explanatory or exemplary but not restrictive. Thus, the technology according to the present disclosure achieves, together with or in place of the above-described effects, any other effect that is obvious to the skilled person in the art from description of the present specification.

Configurations as described below belong to the technical scope of the present disclosure.

(1)

An information processing device comprising:

a recognition unit configured to recognize the physical relation between a real object and a first virtual object positioned on an identical surface; and a control unit configured to control the behavior of the real object based on the physical relation.

(2)

The information processing device according to (1), wherein the first virtual object is displayed on the surface on which the real object is positioned, or the first virtual object is projected on the surface.

(3)

The information processing device according to (2), wherein the control unit controls the behavior by controlling the position or a physical quantity of the real object.

(4)

The information processing device according to (3), wherein the physical quantity includes speed, acceleration, mass, density, length, friction coefficient, elastic force, or temperature.

(5)

The information processing device according to any one of (2) to (4), wherein the recognition unit recognizes the physical relation between the first virtual object and the real object by recognizing the physical relation between the first virtual object and a second virtual object corresponding to the real object.

(6)

The information processing device according to (5), wherein the control unit controls the behavior of the real object based on the behavior of the second virtual object.

(7)

The information processing device according to (6), wherein the control unit controls the behavior of the real object in accordance with the behavior of the second virtual object.

(8)

The information processing device according to (7), wherein the control unit predicts the behavior of the real object by using the second virtual object and controls the behavior of the real object based on a result of the prediction.

(9)

The information processing device according to any one of (5) to (8), wherein the control unit controls the behavior of the second virtual object based on the behavior of the real object.

(10)

The information processing device according to (9), wherein the control unit controls the second virtual object to stop at a stopping position of the real object.

(11)

The information processing device according to (9) or (10), wherein when the behavior of the real object is delayed behind the behavior of the second virtual object by a predetermined time or longer, the control unit stops the behavior of the second virtual object based on the behavior of the real object or slows down the speed of the behavior of the second virtual object.

(12)

The information processing device according to any one of (2) to (11), wherein the control unit controls the behavior of the real object based on an environment or material represented by the first virtual object.

(13)

The information processing device according to any one of (2) to (12), wherein the control unit controls the behavior of the real object by controlling the real object or an external device that acts on the real object.

(14)

The information processing device according to (13), wherein the control unit generates control information for controlling the behavior of the real object, and the information processing device further includes a transmission unit configured to transmit the control information to the real object or the external device.

(15)

The information processing device according to (13), wherein the control unit generates control information for controlling the behavior of the real object, and the information processing device further includes an emission unit configured to emit light used for control of the behavior of the real object based on the control information.

(16)

The information processing device according to any one of (2) to (15), wherein the recognition unit recognizes collision, contact, or a position relation between the first virtual object and the real object, as the physical relation.

(17)

An information processing method executed by a computer, the method comprising:

recognizing the physical relation between a real object and a first virtual object positioned on an identical surface; and controlling the behavior of the real object based on the physical relation.

(18)

A computer program that causes a computer to:

recognize the physical relation between a real object and a first virtual object positioned on an identical surface; and control the behavior of the real object based on the physical relation.

Reference Signs List 100 information processing device
110 control unit
111 real object recognition unit
112 virtual object update unit
113 control target update unit
114 control information generation unit
115 video information generation unit
116 recognition real object definition unit
117 virtual object update rule definition unit
118 control target update rule definition unit
119 control real object definition unit
120 input unit
130 graphics display processing unit
140 video output unit
150 control communication unit
160 operation output unit
200 real object
210 control unit
220 operation output unit
230 control communication unit

The invention claimed is:

1. An information processing device, comprising:

a recognition unit configured to recognize a first physical relation between a real object and a first virtual object based on a second physical relation between the first virtual object and a second virtual object, wherein the real object, the first virtual object, and the second virtual object are on an identical surface, and the second virtual object corresponds to the real object; and a control unit configured to:

control a behavior of the real object based on the first physical relation; and control a behavior of the second virtual object to one of stop or slow down in a case where the behavior of the real object on the identical surface is delayed with respect to the behavior of the second virtual object on the identical surface by one of a first time or a second time, wherein the second time is longer than the first time.

2. The information processing device according to claim 1, further comprising a video output unit configured to one of display or project the first virtual object on the identical surface.

3. The information processing device according to claim 2, wherein the control unit is further configured to control one of a position of the real object or a physical quantity of the real object to control the behavior of the real object.

4. The information processing device according to claim 3, wherein the physical quantity includes at least one of a speed, an acceleration, a mass, a density, a length, a friction coefficient, an elastic force, or a temperature.

5. The information processing device according to claim 2, wherein the control unit is further configured to control the behavior of the real object based on the behavior of the second virtual object.

6. The information processing device according to claim 5, wherein the control unit is further configured to control the behavior of the real object in accordance with the behavior of the second virtual object.

7. The information processing device according to claim 6, wherein the control unit is further configured to:

predict the behavior of the real object based on the second virtual object; and control the behavior of the real object based on a result of the prediction.

8. The information processing device according to claim 2, wherein the control unit is further configured to control the second virtual object to stop on the identical surface at a stopping position of the real object.

9. The information processing device according to claim 2, wherein the control unit is further configured to control the behavior of the real object based on one of an environment or a material represented by the first virtual object.

10. The information processing device according to claim 2, wherein the control unit is further configured to control an external device, that acts on the real object, to control the behavior of the real object.

11. The information processing device according to claim 10, further comprising a transmission unit, wherein
the control unit is further configured to:
generate control information; and
control the behavior of the real object based on the control information, and
the transmission unit is configured to transmit the control information to one of the real object or the external device.

12. The information processing device according to claim 10, further comprising an emission unit, wherein
the control unit is further configured to:
generate control information; and
control the behavior of the real object based on the control information,
the emission unit is configured to emit light based on the control information, and
the light is emitted for the control of the behavior of the real object.

13. The information processing device according to claim 2, wherein the recognition unit is further configured to recognize, as the first physical relation, at least one of a collision, a contact, or a position relation between the first virtual object and the real object.

14. An information processing method comprising:
recognizing a first physical relation between a real object and a first virtual object based on a second physical relation between the first virtual object and a second virtual object, wherein
the real object, the first virtual object, and the second virtual object are on an identical surface, and
the second virtual object corresponds to the real object;
controlling a behavior of the real object based on the first physical relation; and
controlling a behavior of the second virtual object to one of stop or slow down in a case where the behavior of the real object on the identical surface is delayed with respect to the behavior of the second virtual object on the identical surface by one of a first time or a second time, wherein the second time is longer that the first time.

15. A non-transitory computer-readable medium having stored thereon, computer-executable instructions which, when executed by a computer, cause the computer to execute operations, the operations comprising:
recognizing a first physical relation between a real object and a first virtual object based on a second physical relation between the first virtual object and a second virtual object, wherein
the real object, the first virtual object, and the second virtual object are positioned on an identical surface, and
the second virtual object corresponds to the real object;
controlling a behavior of the real object based on the first physical relation; and
controlling a behavior of the second virtual object to one of stop or slow down in a case where the behavior of the real object on the identical surface is delayed with respect to the behavior of the second virtual object on the identical surface by one of a first time or a second time, wherein the second time is longer that the first time.

* * * * *